US012626707B2

(12) United States Patent
Santhanam et al.

(10) Patent No.: US 12,626,707 B2
(45) Date of Patent: May 12, 2026

(54) LOW LATENCY AUDIO FOR IMMERSIVE GROUP COMMUNICATION SESSIONS

(71) Applicant: Apple Inc., Cupertino, CA (US)

(72) Inventors: Karthick Santhanam, Campbell, CA (US); Christopher M. Garrido, Santa Clara, CA (US); David L. Biderman, Los Gatos, CA (US); Luciano M. Verger, San Jose, CA (US); Patrick Miauton, Redwood City, CA (US); Sachin Abhyankar, San Diego, CA (US)

(73) Assignee: Apple Inc., Cupertino, CA (US)

( * ) Notice: Subject to any disclaimer, the term of this patent is extended or adjusted under 35 U.S.C. 154(b) by 163 days.

(21) Appl. No.: 18/435,949

(22) Filed: Feb. 7, 2024

(65) Prior Publication Data

US 2024/0339117 A1     Oct. 10, 2024

Related U.S. Application Data

(60) Provisional application No. 63/470,956, filed on Jun. 4, 2023, provisional application No. 63/457,798, filed on Apr. 7, 2023.

(51) Int. Cl.
*G10L 19/008* (2013.01)
*G10L 19/24* (2013.01)
*H04L 65/75* (2022.01)

(52) U.S. Cl.
CPC ............ *G10L 19/008* (2013.01); *G10L 19/24* (2013.01); *H04L 65/75* (2022.05)

(58) Field of Classification Search
CPC ......... G06N 3/044; G10L 15/02; G10L 15/20; G10L 19/005; G10L 19/008; G10L 19/02; G10L 19/167; G10L 19/24; G10L 25/69; G11B 27/3027; G11B 20/1866; H04L 1/0075; H04L 1/08; H04L 43/0829; H04L 49/9023; H04L 65/75; H04L 65/80; H04L 12/1827; H04L 41/5025; H04L 43/04; H04L 43/062; H04L 43/0852; H04L 43/087; H04L 43/106; H04L 49/9005; H04M 3/002; H04M 3/568; H04W 4/80; G06T 13/205; H04N 19/132; H04N 21/21; H04N 21/43637
See application file for complete search history.

(56) References Cited

U.S. PATENT DOCUMENTS

| | | | | | |
|---|---|---|---|---|---|
| 5,835,495 | A | * | 11/1998 | Ferriere | H04N 21/21 370/465 |
| 7,548,855 | B2 | * | 6/2009 | Chen | G10L 25/69 704/230 |
| 7,613,615 | B1 | * | 11/2009 | Mahmood | G11B 20/1866 704/503 |
| 10,614,816 | B2 | | 4/2020 | Atti et al. | |

(Continued)

FOREIGN PATENT DOCUMENTS

WO     WO 1999/059335     11/1999

*Primary Examiner* — Gerald Gauthier
(74) *Attorney, Agent, or Firm* — BAKERHOSTETLER

(57)     ABSTRACT

Aspects of the subject technology may provide low latency audio for group communication sessions. Low latency audio may be provided, some examples, by an electronic device using a lowest audio block size that is lower than a lowest audio block size that is available to one or more other electronic devices in an group communication session.

20 Claims, 9 Drawing Sheets

(56)                References Cited

U.S. PATENT DOCUMENTS

| | | | | |
|---|---|---|---|---|
| 10,735,120 | B1 * | 8/2020 | Kantharaju | H04L 43/087 |
| 11,295,743 | B1 * | 4/2022 | Bumberger | G10L 15/02 |
| 12,160,460 | B2 * | 12/2024 | Singh | H04L 43/062 |
| 2005/0259694 | A1 * | 11/2005 | Garudadri | H04L 69/04 |
| | | | | 370/352 |
| 2007/0258700 | A1 * | 11/2007 | Ivashin | H04L 43/106 |
| | | | | 386/328 |
| 2008/0208601 | A1 * | 8/2008 | Stewart | G11B 27/3027 |
| 2009/0037188 | A1 * | 2/2009 | Liebchen | G10L 19/008 |
| | | | | 704/500 |
| 2009/0247152 | A1 * | 10/2009 | Manne | H04N 21/43637 |
| | | | | 455/426.2 |
| 2010/0150243 | A1 | 6/2010 | Kure | |
| 2010/0312553 | A1 * | 12/2010 | Fang | G10L 19/005 |
| | | | | 704/226 |
| 2011/0252287 | A1 | 10/2011 | Kure | |
| 2012/0084089 | A1 * | 4/2012 | Lloyd | G10L 15/20 |
| | | | | 704/500 |
| 2013/0073297 | A1 * | 3/2013 | Yu | H04N 19/132 |
| | | | | 704/500 |
| 2014/0071978 | A1 * | 3/2014 | Hubner | H04M 3/002 |
| | | | | 370/352 |
| 2014/0269289 | A1 | 9/2014 | Effros | |
| 2015/0106106 | A1 * | 4/2015 | Atti | H04L 1/0075 |
| | | | | 704/500 |
| 2018/0109565 | A1 * | 4/2018 | Singh | H04L 43/0852 |
| 2018/0295050 | A1 * | 10/2018 | Lee | H04L 43/04 |
| 2019/0014050 | A1 * | 1/2019 | Wang | H04L 49/9005 |
| 2019/0041842 | A1 | 2/2019 | Cella | |
| 2019/0281103 | A1 * | 9/2019 | Singh | H04L 41/5025 |
| 2019/0373526 | A1 | 12/2019 | Chow | |
| 2020/0177311 | A1 | 6/2020 | Ho | |
| 2020/0265854 | A1 * | 8/2020 | Moon | H04W 4/80 |
| 2021/0027511 | A1 * | 1/2021 | Shang | G06N 3/044 |
| 2021/0075544 | A1 * | 3/2021 | Pollack | H04L 49/9023 |
| 2022/0189491 | A1 | 6/2022 | Liang | |
| 2022/0201252 | A1 * | 6/2022 | Graff | H04L 12/1827 |
| 2023/0230605 | A1 * | 7/2023 | Alakuijala | G10L 19/02 |
| | | | | 704/500 |
| 2023/0412314 | A1 | 12/2023 | Mao | |
| 2024/0339117 | A1 * | 10/2024 | Santhanam | H04L 65/80 |
| 2024/0339120 | A1 * | 10/2024 | Bisht | H04L 65/75 |

* cited by examiner

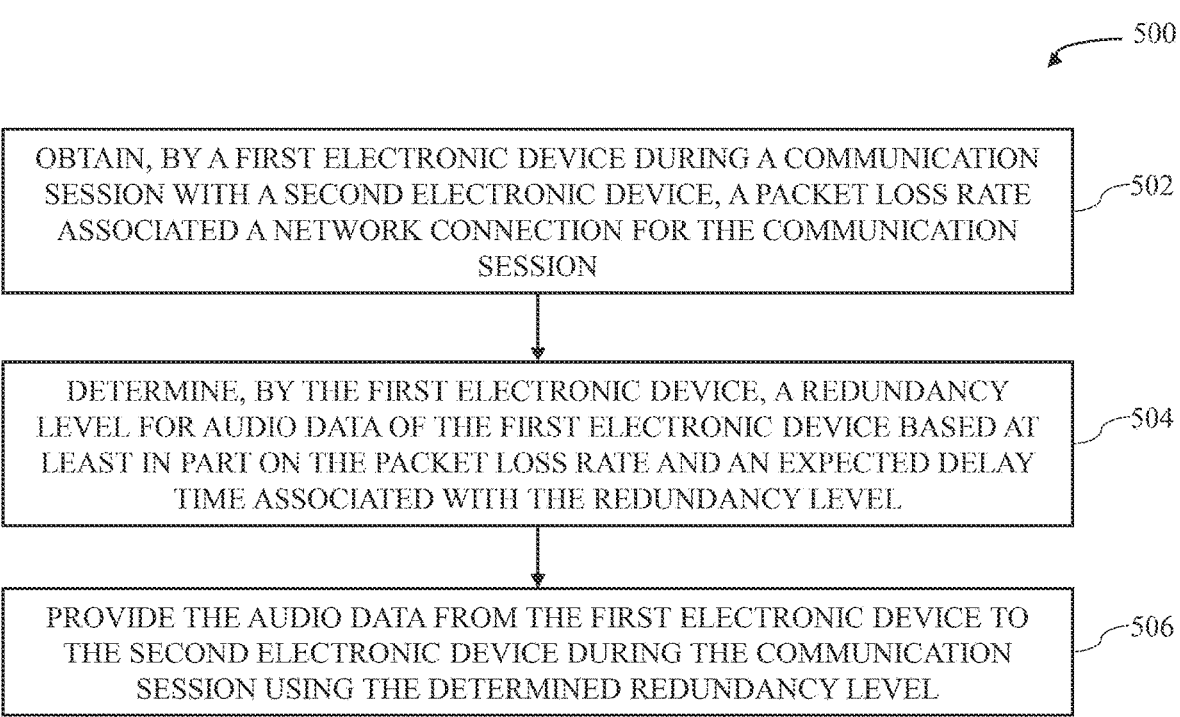

500

OBTAIN, BY A FIRST ELECTRONIC DEVICE DURING A COMMUNICATION SESSION WITH A SECOND ELECTRONIC DEVICE, A PACKET LOSS RATE ASSOCIATED A NETWORK CONNECTION FOR THE COMMUNICATION SESSION —502

DETERMINE, BY THE FIRST ELECTRONIC DEVICE, A REDUNDANCY LEVEL FOR AUDIO DATA OF THE FIRST ELECTRONIC DEVICE BASED AT LEAST IN PART ON THE PACKET LOSS RATE AND AN EXPECTED DELAY TIME ASSOCIATED WITH THE REDUNDANCY LEVEL —504

PROVIDE THE AUDIO DATA FROM THE FIRST ELECTRONIC DEVICE TO THE SECOND ELECTRONIC DEVICE DURING THE COMMUNICATION SESSION USING THE DETERMINED REDUNDANCY LEVEL —506

FIG. 5

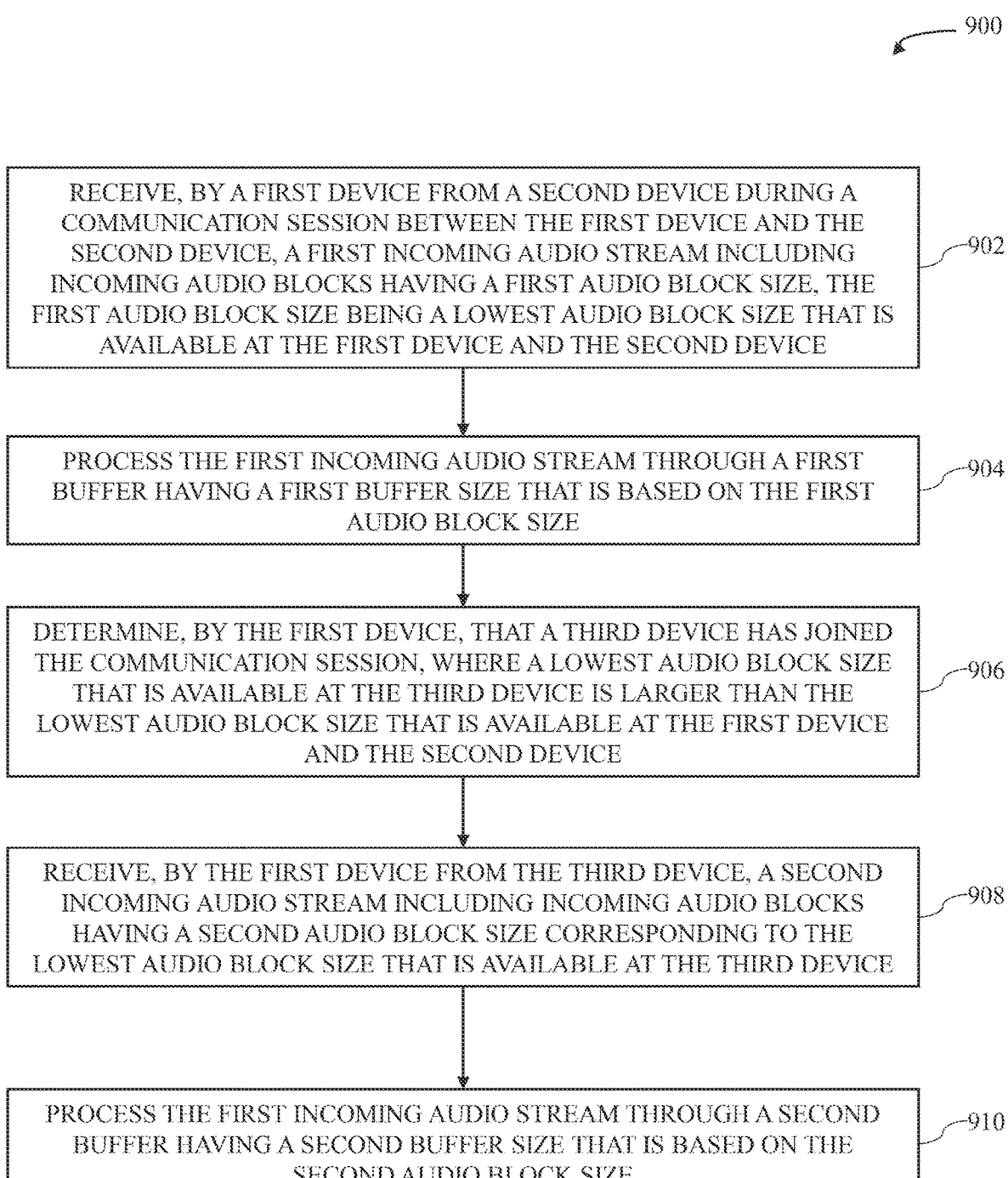

— 900

RECEIVE, BY A FIRST DEVICE FROM A SECOND DEVICE DURING A COMMUNICATION SESSION BETWEEN THE FIRST DEVICE AND THE SECOND DEVICE, A FIRST INCOMING AUDIO STREAM INCLUDING INCOMING AUDIO BLOCKS HAVING A FIRST AUDIO BLOCK SIZE, THE FIRST AUDIO BLOCK SIZE BEING A LOWEST AUDIO BLOCK SIZE THAT IS AVAILABLE AT THE FIRST DEVICE AND THE SECOND DEVICE          902

PROCESS THE FIRST INCOMING AUDIO STREAM THROUGH A FIRST BUFFER HAVING A FIRST BUFFER SIZE THAT IS BASED ON THE FIRST AUDIO BLOCK SIZE          904

DETERMINE, BY THE FIRST DEVICE, THAT A THIRD DEVICE HAS JOINED THE COMMUNICATION SESSION, WHERE A LOWEST AUDIO BLOCK SIZE THAT IS AVAILABLE AT THE THIRD DEVICE IS LARGER THAN THE LOWEST AUDIO BLOCK SIZE THAT IS AVAILABLE AT THE FIRST DEVICE AND THE SECOND DEVICE          906

RECEIVE, BY THE FIRST DEVICE FROM THE THIRD DEVICE, A SECOND INCOMING AUDIO STREAM INCLUDING INCOMING AUDIO BLOCKS HAVING A SECOND AUDIO BLOCK SIZE CORRESPONDING TO THE LOWEST AUDIO BLOCK SIZE THAT IS AVAILABLE AT THE THIRD DEVICE          908

PROCESS THE FIRST INCOMING AUDIO STREAM THROUGH A SECOND BUFFER HAVING A SECOND BUFFER SIZE THAT IS BASED ON THE SECOND AUDIO BLOCK SIZE          910

STORAGE

SYSTEM MEMORY

OUTPUT DEVICE INTERFACE

ROM

PROCESSOR(S)

INPUT DEVICE INTERFACE

NETWORK INTERFACE(S)

1010

1012

1014

1016

LOW LATENCY AUDIO FOR IMMERSIVE GROUP COMMUNICATION SESSIONS

CROSS REFERENCE TO RELATED APPLICATIONS

This application claims the benefit of priority to U.S. Provisional Patent Application No. 63/470,956, entitled, "Low Latency Audio for Immersive Group Communication Sessions", filed on Jun. 4, 2023, and U.S. Provisional Patent Application No. 63/457,798, entitled, "Low Latency Audio for Immersive Group Communication Sessions", filed on Apr. 7, 2023, the disclosure of each of which is hereby incorporated herein in its entirety.

TECHNICAL FIELD

The present description relates generally to electronic communications, including, for example, low latency audio for immersive group communication sessions.

BACKGROUND

Audio content is often transmitted between electronics devices during calls or video conferences between the electronic devices.

BRIEF DESCRIPTION OF THE DRAWINGS

Certain features of the subject technology are set forth in the appended claims. However, for purpose of explanation, several embodiments of the subject technology are set forth in the following figures.

FIG. 5 illustrates an example process that may be performed for providing low latency audio for group communication sessions, in accordance with one or more implementations.

FIG. 9 illustrates an example process that may be performed for providing group communication sessions for devices using various audio block sizes, in accordance with one or more implementations.

DETAILED DESCRIPTION

Figure 1:
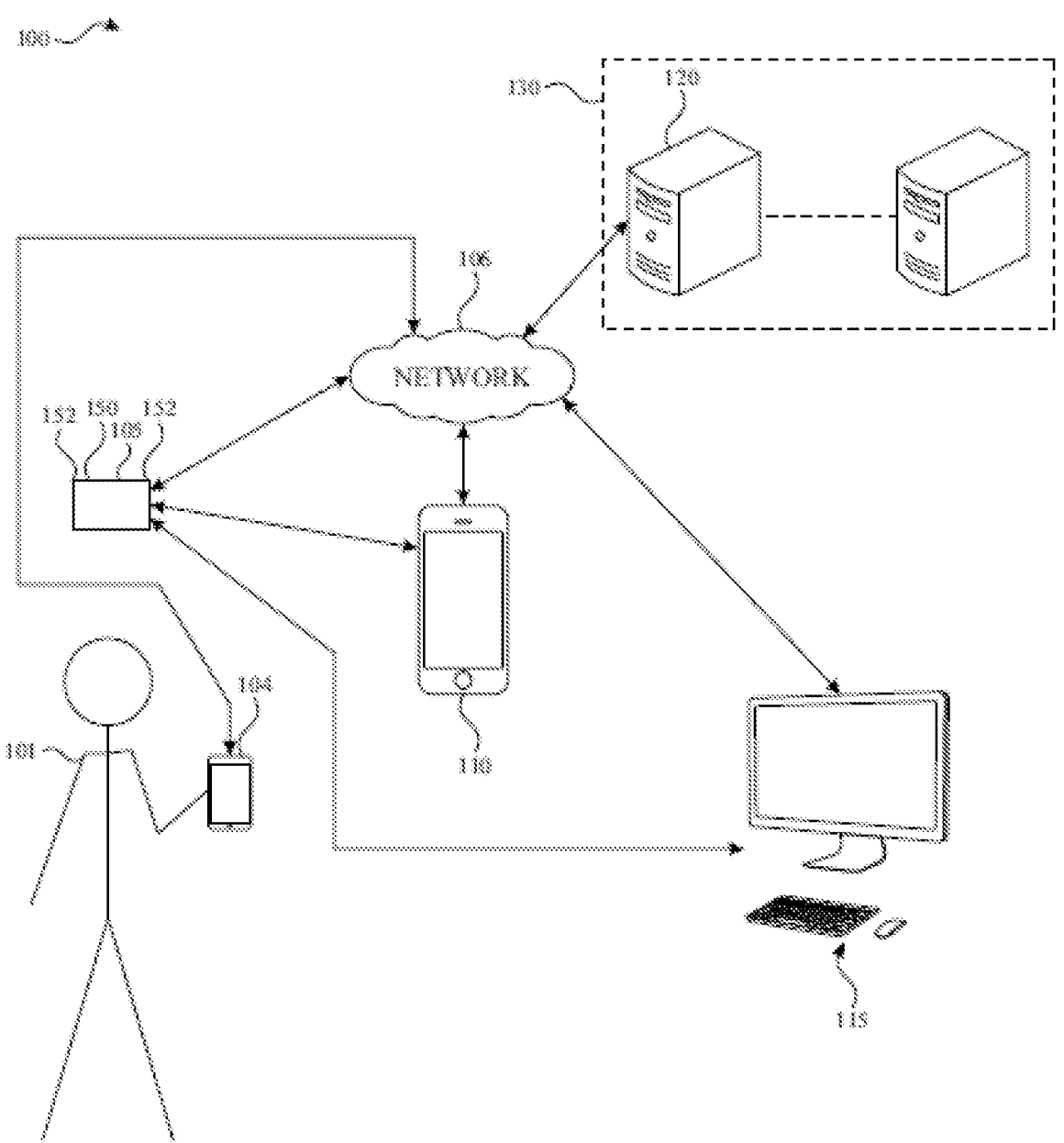
FIG. 1 illustrates an example system architecture including various electronic devices that may implement the subject system in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Aspects of the subject technology may provide low latency audio for group communications sessions, such as audio calls, audio conferencing, video conferencing, livestreaming, real-time data sharing experiences, and/or XR group sessions (as examples). Typically, audio data such as voice data is sent with a goal of maximizing the quality of the audio (e.g., minimizing an amount of missing audio data due to packet loss) at a receiving device. However, this emphasis on quality can result in latency issues that can be particularly noticeable in, for example, video conferencing, livestreaming, real-time data sharing experiences, and/or XR group session use cases (e.g., use cases in which video or other shared data that accompanies the audio data is provided for output along with the audio data, and/or in which high levels of user interaction with other users occurs).

In one or more implementations of the subject technology, low latency audio may be provided for group communication sessions by, for example, determining whether to increase audio redundancy (e.g., responsive to an increase in network congestion) based at least in part on a known delay time associated with that increase in audio redundancy. In this way (and as described in further detail hereinafter), an expected latency can be used as a metric, in addition to audio quality, when determining how much audio redundancy should be used for transmitting audio data. For example, if the delay time associated with a particular audio redundancy would exceed an audio delay threshold, then that particular redundancy may be too high and may not be used. In one or more implementations, in order, for example, to balance potentially competing effects of audio quality and audio latency, a determination of whether to increase redundancy can be made based on a weighted average of a packet loss rate and an expected delay time associated with the increase in redundancy. Handling redundancy for audio in this way can facilitate providing low latency audio, which can be particularly beneficial in, for example, immersive group communication sessions, such XR group communication sessions and/or real-time data sharing experiences. In one or more implementations, a device may be provided with an ultra-low latency tier having an audio block size that is lower than the audio block size of other devices that may participate in a group communication session.

FIG. 1 illustrates an example system architecture 100 including various electronic devices that may implement the subject system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The system architecture 100 includes an electronic device 105, an electronic device 104, an electronic device 110, an electronic device 115, and a server 120. For explanatory purposes, the system architecture 100 is illustrated in FIG. 1 as including the electronic device 105, the electronic device 104, the electronic device 110, the electronic device 115, and the server 120; however, the system architecture 100 may include any number of electronic devices, and any number of servers or a data center including multiple servers.

The electronic device 105 may be implemented, for example, as a tablet device, a smartphone, or as a head mountable portable system (e.g., worn by a user 101). The electronic device 105 includes a display system capable of presenting a visualization of an extended reality environment to the user. The electronic device 105 may be powered with a battery and/or another power supply. In an example, the display system of the electronic device 105 provides a stereoscopic presentation of the extended reality environment, enabling a three-dimensional visual display of a rendering of a particular scene, to the user. In one or more implementations, instead of, or in addition to, utilizing the electronic device 105 to access an extended reality environment, the user may use a electronic device 104, such as a tablet, watch, mobile device, and the like.

The electronic device 105 may include one or more cameras such as camera(s) 150 (e.g., visible light cameras, infrared cameras, etc.) Further, the electronic device 105 may include various sensors 152 including, but not limited to, cameras, image sensors, touch sensors, microphones, inertial measurement units (IMU), heart rate sensors, temperature sensors, depth sensors (e.g., Lidar sensors, radar sensors, sonar sensors, time-of-flight sensors, etc.), GPS sensors, Wi-Fi sensors, near-field communications sensors, radio frequency sensors, etc. Moreover, the electronic device 105 may include hardware elements that can receive user input such as hardware buttons or switches. User inputs detected by such sensors and/or hardware elements may correspond to, for example, various input modalities for initiating a group communications session (group session) from within an application. For example, such input modalities may include, but are not limited to, facial tracking, eye tracking (e.g., gaze direction), hand tracking, gesture tracking, biometric readings (e.g., heart rate, pulse, pupil dilation, breath, temperature, electroencephalogram, olfactory), recognizing speech or audio (e.g., particular hotwords), and activating buttons or switches, etc.

In one or more implementations, the electronic device 105 may be communicatively coupled to a base device such as the electronic device 110 and/or the electronic device 115. Such a base device may, in general, include more computing resources and/or available power in comparison with the electronic device 105. In an example, the electronic device 105 may operate in various modes. For instance, the electronic device 105 can operate in a standalone mode independent of any base device. When the electronic device 105 operates in the standalone mode, the number of input modalities may be constrained by power and/or processing limitations of the electronic device 105 such as available battery power of the device. In response to power limitations, the electronic device 105 may deactivate certain sensors within the device itself to preserve battery power and/or to free processing resources.

The electronic device 105 may also operate in a wireless tethered mode (e.g., connected via a wireless connection with a base device, working in conjunction with a given base device. The electronic device 105 may also work in a connected mode where the electronic device 105 is physically connected to a base device (e.g., via a cable or some other physical connector) and may utilize power resources provided by the base device (e.g., where the base device is charging the electronic device 105 while physically connected).

When the electronic device 105 operates in the wireless tethered mode or the connected mode, a least a portion of processing user inputs and/or rendering the extended reality environment may be offloaded to the base device thereby reducing processing burdens on the electronic device 105. For instance, in an implementation, the electronic device 105 works in conjunction with the electronic device 110 or the electronic device 115 to generate an extended reality environment including physical and/or virtual objects that enables different forms of interaction (e.g., visual, auditory, and/or physical or tactile interaction) between the user and the generated extended reality environment in a real-time manner. In an example, the electronic device 105 provides a rendering of a scene corresponding to the extended reality environment that can be perceived by the user and interacted with in a real-time manner, such as a host environment for a group session with another user. Additionally, as part of presenting the rendered scene, the electronic device 105 may provide sound, and/or haptic or tactile feedback to the user. The content of a given rendered scene may be dependent on available processing capability, network availability and capacity, available battery power, and current system workload.

The network 106 may communicatively (directly or indirectly) couple, for example, the electronic device 105, the electronic device 110, and/or the electronic device 115 with each other device and/or the server 120. In one or more implementations, the network 106 may be an interconnected network of devices that may include, or may be communicatively coupled to, the Internet.

The electronic device 110 may include a touchscreen and may be, for example, a smartphone that includes a touchscreen, a portable computing device such as a laptop computer that includes a touchscreen, a companion device that includes a touchscreen (e.g., a digital camera, headphones), a tablet device that includes a touchscreen, a wearable device that includes a touchscreen such as a watch, a band, and the like, any other appropriate device that includes, for example, a touchscreen, or any electronic device with a touchpad. In one or more implementations, the electronic device 110 may not include a touchscreen but may support touchscreen-like gestures, such as in an extended reality environment. In one or more implementations, the electronic device 110 may include a touchpad. In FIG. 1, by way of example, the electronic device 110 is depicted as a mobile smartphone device. In one or more implementations, the electronic device 110, the electronic device 104, and/or the electronic device 105 may be, and/or may include all or part of, the electronic system discussed below with respect to FIG. 6. In one or more implementations, the electronic device 110 may be another device such as an Internet Protocol (IP) camera, a tablet, or a companion device such as an electronic stylus, etc.

The electronic device 115 may be, for example, desktop computer, a portable computing device such as a laptop computer, a smartphone, a companion device (e.g., a digital camera, headphones), a tablet device, a wearable device such as a watch, a band, and the like. In FIG. 1, by way of example, the electronic device 115 is depicted as a desktop computer. The electronic device 115 may be, and/or may include all or part of, the electronic system discussed below with respect to FIG. 6.

The server 120 may form all or part of a network of computers or a group of servers 130, such as in a cloud computing or data center implementation. For example, the server 120 stores data and software, and includes specific hardware (e.g., processors, graphics processors and other specialized or custom processors) for rendering and generating content such as graphics, images, video, audio and multi-media files for extended reality environments. In an implementation, the server 120 may function as a cloud storage server that stores any of the aforementioned extended reality content generated by the above-discussed devices and/or the server 120.

Figure 2:
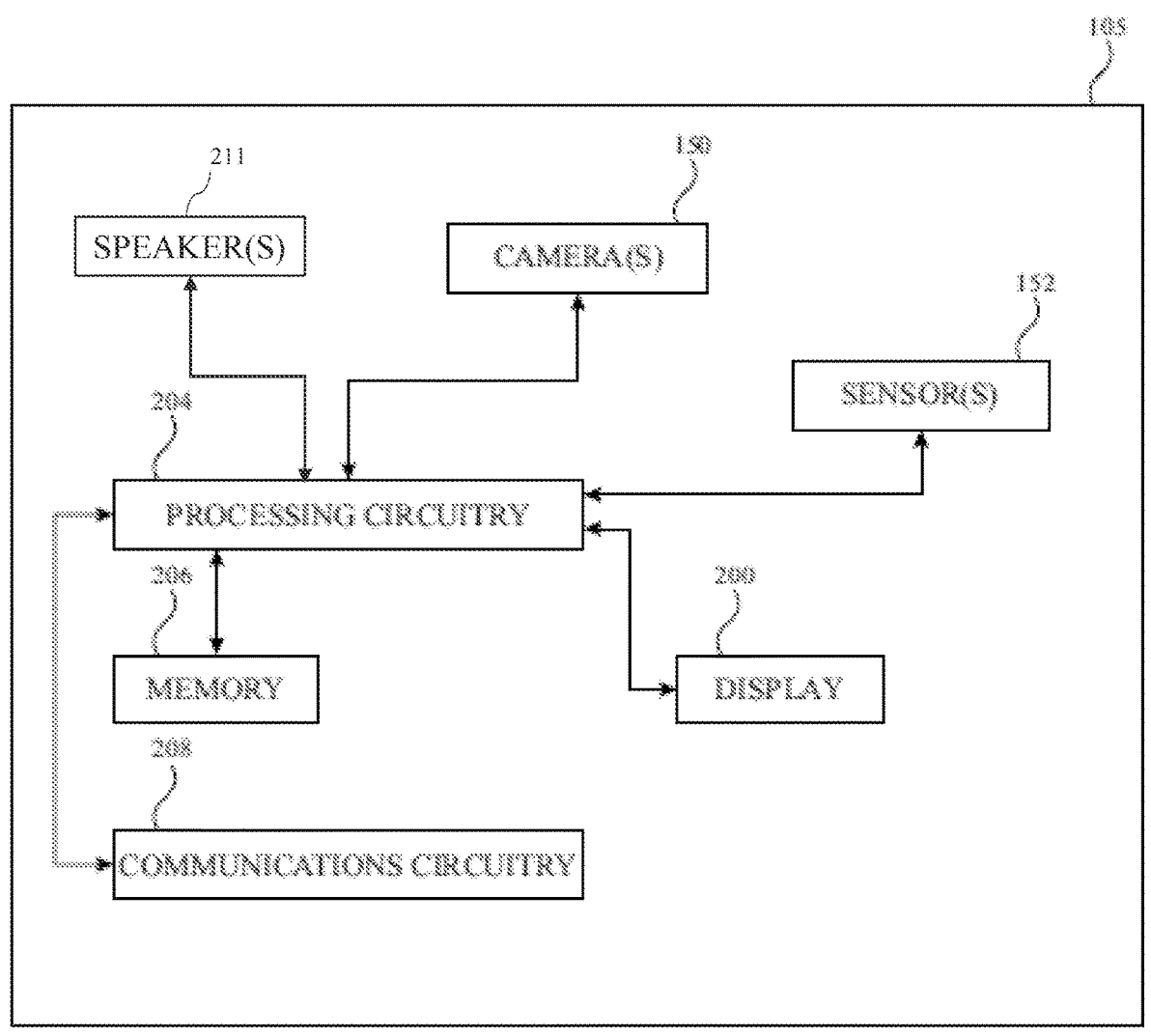
FIG. 2 illustrates a block diagram of example features of an electronic device in accordance with one or more implementations.

FIG. 2 illustrates a block diagram of various components that may be included in electronic device 105, in accordance with aspects of the disclosure. As shown in FIG. 2, electronic device 105 may include one or more cameras such as camera(s) 150 that capture images and/or video of the physical environment around the electronic device, one or more sensors 152 that obtain environment information (e.g., depth information) associated with the physical environment around the electronic device 105. Sensors 152 may include depth sensors (e.g., time-of-flight sensors, infrared sensors, radar, sonar, lidar, etc.), one or more microphones, and/or other types of sensors for sensing the physical environment. For example, one or more microphones included in the sensor(s) 152 may be operable to capture audio input from a user of the electronic device 105, such as a voice input corresponding to the user speaking into the microphones. In the example of FIG. 2, electronic device 105 also includes communications circuitry 208 for communication with electronic device 110, electronic device 115, servers 120, and/or other devices and/or systems in some implementations. Communications circuitry 208 may include radio frequency (RF) communications circuitry for detecting radio frequency identification (RFID) tags, Bluetooth Low Energy (BLE) communications circuitry, other near-field communications (NFC) circuitry, WiFi communications circuitry, cellular communications circuitry, and/or other wired and/or wireless communications circuitry.

As shown, electronic device 105 includes processing circuitry 204 (e.g., one or more processors and/or integrated circuits) and memory 206. Memory 206 may store (e.g., temporarily or permanently) content generated by and/or otherwise obtained by electronic device 105. In some operational scenarios, memory 206 may temporarily store images of a physical environment captured by camera(s) 150, depth information corresponding to the images generated, for example, using a depth sensor of sensors 152, meshes corresponding to the physical environment, virtual objects such as virtual objects generated by processing circuitry 204 to include virtual content, and/or virtual depth information for the virtual objects. Memory 206 may store (e.g., temporarily or permanently) intermediate images and/or information generated by processing circuitry 204 for combining the image(s) of the physical environment and the virtual objects and/or virtual image(s) to form, e.g., composite images for display by display 200, such as by compositing one or more virtual objects onto a pass-through video stream obtained from one or more of the cameras 150.

As shown, the electronic device 105 may include one or more speakers 211. The speakers may be operable to output audio content, including audio content stored and/or generated at the electronic device 105, and/or audio content received from a remote device or server via the communications circuitry 208. In one or more implementations, the memory 206 may include a jitter buffer configured to store audio data received from another electronic device (e.g., electronic device 110 in some examples) prior to output of audio content corresponding to the audio data by the speaker(s) 211.

Memory 206 may store instructions or code for execution by processing circuitry 204, such as, for example operating system code corresponding to an operating system installed on the electronic device 105, and application code corresponding to one or more applications installed on the electronic device 105. The operating system code and/or the application code, when executed, may correspond to one or more operating system level processes and/or application level processes, such as processes that support management of group communication sessions. The operating system level processes may have administrative privileges (e.g., unconstrained access) to logical resources, e.g., file system resources, and/or as physical resources, e.g., hardware resources such as camera(s) 150, sensors 152, and the like, whereas the application code, when executed, may correspond to one or more application processes that have constrained access, or no access, to one or more of the logical and/or physical resources (in some examples).

In one or more implementations, an application process and/or an operating system process at a first electronic device (e.g., the electronic device 105), may initiate and/or manage a group communication session with one or more other electronic devices (e.g., another instance of the electronic device 105 or another electronic device such as the electronic device 104, the electronic device 110, or the electronic device 115 of FIG. 1). In various use cases, a group communication session may be a communication session between a first electronic device and a second electronic device, or a communication session between the first electronic device and multiple other electronic devices (e.g., a second electronic device and a third electronic, a fourth electronic device, a fifth electronic device, and/or any number of other electronic devices).

Figure 3:
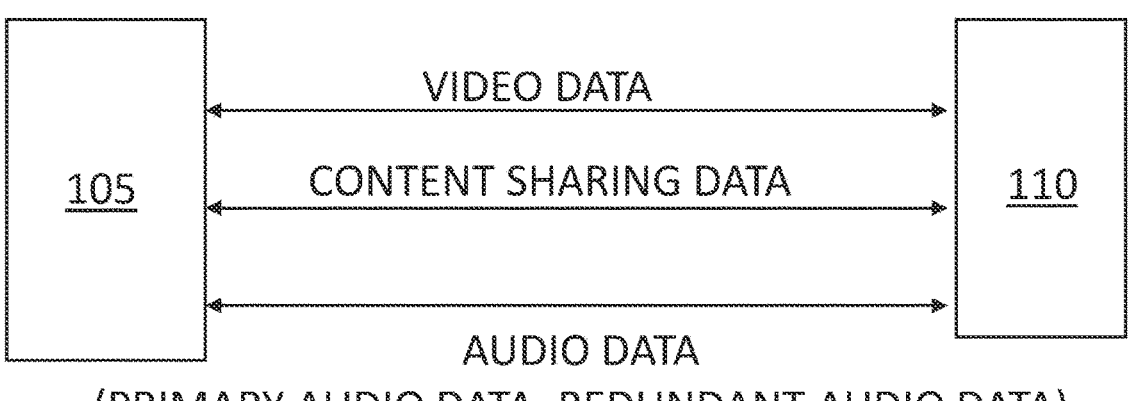
FIG. 3 illustrates an example transmission of audio data including redundant audio data during a communication session in accordance with one or more implementations.

FIG. 3 illustrates an example use case in which the electronic device 105 is participating in a group communication session with the electronic device 110. In various implementations, a group communication session may include an audio call in which audio data (e.g., including voice data of one or more users) is transmitted between devices participating in the audio call, an audio conferencing session in which audio data (e.g., including voice data of one or more users) is transmitted between devices participating in the audio conferencing session, a video conferencing session in which audio data (e.g., including voice data of one or more users) and video data (e.g., including images of one or more users) is transmitted between devices participating in the video conferencing session, a livestreaming session in which audio data (e.g., including voice data of one or more users) and video data (e.g., images of a livestreaming user and/or an environment of the livestreaming user) is transmitted between devices participating in the livestreaming session, a real-time data sharing experience in which audio data (e.g., including voice data of one or more users) and application data (e.g., a movie, a show, a song, or gaming information that is being concurrently viewed by users of multiple devices in the real-time data sharing experience) is transmitted between devices participating in the audio conferencing session, and/or a XR group communication session.

In one or more implementations, an XR group communication session (also referred to herein as a group session or an immersive group communication session) may allow multiple users to be present (e.g., concurrently present) in a common XR environment via their respective devices. For example, the respective displays of the respective devices participating in the XR group communication session may display the same virtual content such that the virtual content appears at the same locations (e.g., relative to the displaying device) in the respective environments of the respective users. In these XR use cases, the users may be physically co-located in the same physical location, and/or one or more of the users may be located in physically remote locations from each the locations of one or more other users.

As shown in the example use case of FIG. 3, during a group communication session, the electronic device 105 may provide (e.g., transmit) audio data to another electronic device such as the electronic device 110. As shown, the electronic device 105 may also provide (e.g., transmit) other data along with the audio data, such as video data and/or content sharing data. In one or more implementations, the audio data, the video data, and/or the content sharing data may be provided for synchronized output at the electronic device 110 (e.g., synchronized in time with the output of the same content sharing data at the electronic device 105, and/or synchronized output of the video data and/or the content sharing data with the output of the audio data).

In one or more use cases, the audio data may include voice data corresponding to a voice of a user of the electronic device 105 (e.g., captured using a microphone of the sensor(s) 152 of the electronic device 105 when the user of the electronic device 105 is speaking). For example, the user of the electronic device 105 may speak into or near the electronic device 105, and one or more microphones of the electronic device 105 may generate voice data (e.g., a voice signal) corresponding to the speaking of the user. The electronic device 105 (e.g., processing circuitry 204) may then encode, package, and send audio data corresponding to the voice data to the electronic device 110. The electronic device 110 may then provide (e.g., using one or more speakers of the electronic device 110) an audio output corresponding to the voice data generated at the electronic device 105. In this way, the user of the electronic device 105 can speak to the user of the electronic device 110, via the electronic devices 105 and 110 during the group communication session, even when the user of the electronic device 110 is not within audible range of the user of the electronic device 105, and/or when the users of the electronic devices 105 and/or 110 are using headphones or earbuds to listen to audio outputs from their respective devices. In one or more implementations, a camera 150 of the electronic device 105 may capture images (e.g., video frames) of the user of the electronic device 105 while the user of the electronic device 105 is speaking. The captured images (e.g., video frames) may be transmitted to the electronic device 110 for display, at the electronic device 110, in synchronization with the output of the audio data at the electronic device 110. For example, the video data may include a video of the user of the electronic device 105 speaking (e.g., to the user of the electronic device 110) that is to be output in synchronization with the output of the voice of the user of the electronic device 105. In one or more implementations, avatar data, corresponding to an avatar of the user of the electronic device 105, may also be provided from the electronic device 105 to another electronic device 105 and/or to the electronic device 110 (e.g., for display with movements that are synchronized with the audio data corresponding to the user speaking).

Similarly (e.g., in response to hearing the user of the electronic device 105 speak via the electronic device 110 and/or seeing the user of the electronic device 105 in the video data via the electronic device 110), the user of the electronic device 110 may speak into or near the electronic device 110, and one or more microphones of the electronic device 110 may generate voice data (e.g., a voice signal) corresponding to the speaking of the user of the electronic device 110. The electronic device 110 (e.g., processing circuitry 204 of the electronic device 110) may then encode, package, and send audio data corresponding to the voice data to the electronic device 105. The electronic device 105 may then provide (e.g., using one or more speakers 211 of the electronic device 105) an audio output corresponding to the voice data generated at the electronic device 110. In this way, the user of the electronic device 110 can speak (e.g., back) to the user of the electronic device 105, via the electronic devices 110 and 105 during the group communication session, even when the user of the electronic device 105 is not within audible range of the user of the electronic device 110 and/or when the users of the electronic devices 105 and/or 110 are using headphones or earbuds to listen to audio outputs from their respective devices.

In one or more use cases, the content sharing data may include or correspond to additional audio data (e.g., music, poetry, a podcast, etc. that is being concurrently output by the electronic device 105 and the electronic device 110 during a group communication session in which the audio data and/or video data is also being sent between the devices), additional video content (e.g., recorded video content such as a movie or a show being concurrently played on the electronic device 105 and the electronic device 110 during a group communication session in which the audio data and/or video data is also being sent between the devices), and/or gaming content (e.g., images, audio, etc. for a game being concurrently played on the electronic device 105 and the electronic device 110 during a group communication session in which the audio data and/or video data is also being sent between the devices).

Although the audio data is shown in FIG. 3 as being directly sent between the electronic device 105 and the electronic device 110, the audio data may also, or alternatively, be sent between the electronic device 105 and the electronic device 110 over a network, such as the network 106 of FIG. 1. Whether the audio data is transmitted directly (e.g., over a direct WiFi or a Bluetooth) connection or via a network, packet loss can occur in the transmission, which results in missing audio data at the receiving device.

Figure 4:
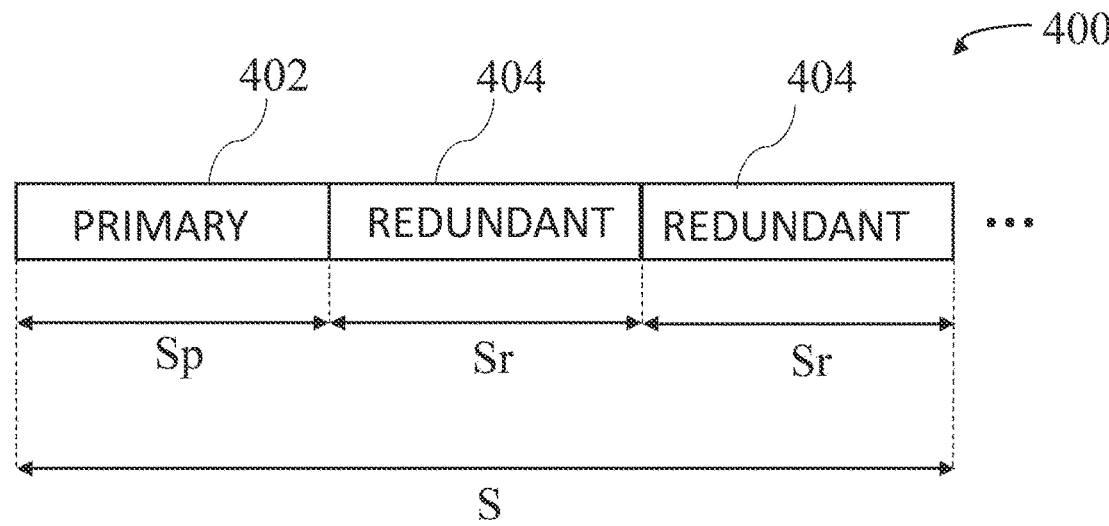
FIG. 4 illustrates an example packet of audio data in accordance with one or more implementations.

In one or more implementations, the electronic device 105 and/or the electronic device 110 can use audio redundancy, for example, to mitigate the effect of missing audio data. For example, as illustrated in FIG. 3, the electronic device 105 can provide, to the electronic device 110, primary audio data (e.g., a current audio block corresponding to most recently received audio input to the electronic device 105) along with redundant audio data (e.g., one or more copies of one or more prior respective audio blocks corresponding to previously received audio input to the electronic device 105). For example, FIG. 4 illustrates a packet 400 of audio data that includes a primary audio block 402 and one or more redundant audio blocks 404. For example, the redundant audio block(s) 404 may be or include copies of primary audio blocks 402 that were sent in previously transmitted packets 400 (or portions of the data within the primary audio blocks that were sent in the previously transmitted packets 400). In one or more implementations, the primary audio block 402 may include a time stamp for the audio data in the primary audio block 402 and the redundant audio block(s) 404 may include an earlier time stamp (e.g., earlier than the time stamp for the primary audio block 402) for the audio data in the redundant audio block(s) 404. In one or more implementations, the earlier time stamp in the redundant audio block(s) 404 may be expressed as an offset from the time stamp in the primary audio block 402 (e.g., an offset time that can be subtracted from the time stamp in the primary audio block 402 to determine the earlier time stamp(s) for the redundant audio block(s)).

In one or more implementations, if a packet 400 including the primary audio data (e.g., primary audio block 402) is lost (e.g., is sent by the electronic device 105 and not received at the electronic device 110), the electronic device 110 can use the redundant audio block(s) 404 in one or more subsequent packets 400 to reconstruct the full stream of audio data, prior to outputting the corresponding audio from the electronic device 110. For example, the electronic device 110 may store packets 400 of audio data in a jitter buffer, and output the audio data in the stored packets with a delay that allows time for the electronic device 110 to reconstruct the data of any missing packets from the redundant data in the jitter buffer.

In the presence of varying network congestion and/or other device and/or network conditions, the amount of packet loss between devices participating in a group communication session (e.g., the electronic device 105 and the electronic device 110 in the example of FIG. 3) can vary. The devices participating in the group communication session can include varying amounts of redundant audio data in the packet(s) 400 in response to the varying amounts of packet loss. For example, the amount of packet loss may be characterized by a packet loss rate (e.g., a number of packets lost per N packets sent or received, such as a percentage packet loss), and the amount of redundant audio data can be increased when the packet loss rate increases.

For example, referring to FIG. 4, in one or more implementations the packet 400 may have a variable size, S, and the redundant audio block(s) 404 may each have a variable size, Sr. An electronic device (e.g., the electronic device 105 or the electronic device 110 in the use case of FIG. 3) may increase the size, S, of the packet 400 and/or the size, Sr, of one or more redundant audio block(s) 404 within the packet 400 when an increase in the packet loss rate is detected. In one or more implementations, because the block sizes of the blocks (e.g., the redundant audio block(s) 404) may be variable, the packet 400 (e.g., the redundant audio block(s) 404) may include block size information (e.g., a block length) for each of one or more redundant audio blocks 404.

However, increasing the amount of redundant audio data in the packet 400 may result in an increased latency for the group conferencing session (e.g., an increased delay time between the input of the audio to one electronic device, such as the electronic device 105, and the output of the same audio from another electronic device, such as the electronic device 110). For example, in a use case in which the electronic device 105 increases the block size (e.g., the size, Sr) of the audio data in the packet 400, the electronic device 110 may correspondingly increase the size of the jitter buffer at the electronic device 110, and resultingly increase the delay time between the input of the audio to the electronic device 105 and the output of the audio at the electronic device 110. Moreover, the additional time to package, encode, transmit, receive, and decode the packet 400 with the increased audio block size may also increase the latency (e.g., increase the delay time between the input of the audio to the electronic device 105 and the output of the audio at the electronic device 110).

Increasing the latency in this way can be detrimental to the group conferencing experience of the users participating in a group conferencing session in a way that can rival or even exceed the detrimental effect of lost packets. For example, a latency of more than, for example, 300 millisec-onds (ms) can cause the users' natural ability to converse to be impacted (e.g., by creating periods of silence when one user believes the other user is not speaking and begins to speak, but during which the other user was, in fact, speak-ing). The detrimental effects of increased latency can also negatively affect the synchronization of audio data output at multiple participating devices (e.g., in a use case in which the users participating in a group conferencing session are attempting to sing a song together, such as singing the Happy Birthday song to a participant in the group confer-encing session), and/or the synchronization of the audio data output with the output of video data and/or content sharing data. For example, the detrimental effects of increased latency can be particularly noticeable to a user when the audio data is meant to be synchronized with video data or content sharing data, including in an XR group session (e.g., including avatar data).

Aspects of the subject technology provide for low latency audio for group communication sessions, even in the pres-ence of packet loss (e.g., due to network congestion and/or other network and/or device conditions). For example, in one or more implementations, an electronic device (e.g., the electronic device 105 or the electronic device 110) that is connected to a group communication session may determine an amount of redundancy based on both a packet loss rate (PLR) and an expected delay time associated with the amount of redundancy.

In one or more implementations, the electronic device 105 and/or the electronic device 110 (e.g., and/or any other devices participating in a group conferencing session) may determine an amount of redundancy to use for the audio data by selecting from multiple redundancy levels. In one or more implementations, each of the redundancy levels may have an associated audio block size (e.g., larger audio block sizes S or Sr for higher redundancy levels) and an associated expected delay time that will result if that redundancy level is used for transmitting audio data. For example, the expected delay time for each redundancy level may have been previously measured empirically (e.g., under nearly ideal network conditions in a laboratory or manufacturer setting). In one or more implementations, a first (e.g., lowest) redundancy level may have a first audio block size that results in an expected delay time of ten milliseconds (ms), a second redundancy level may have a second audio block size, larger than the first audio block size, that results in an expected delay time of twenty milliseconds, a third redundancy level may have a third audio block size, larger than the second audio block size, that results in an expected delay time of forty milliseconds, a fourth redundancy level may have a fourth audio block size, larger than the third audio block size, that results in an expected delay time of forty milliseconds, a fifth redundancy level may have a fifth audio block size, larger than the fourth audio block size, that results in an expected delay time of sixty milliseconds, a sixth redundancy level may have a sixth audio block size, larger than the fifth audio block size, that results in an expected delay time of eighty milliseconds, etc. In one or more implementations, the size, S, of the packet 400 and/or the size, Sr, of the redundant audio block(s) 404 of FIG. 4 may be expressed in audio samples (e.g., when a clock rate used by the electronic device 105 and the electronic device 110, and/or any other electronic devices participating in a group conferencing session, is the same) or in time (e.g., in milliseconds). In one or more implementations, the audio block size may be increased to increase the amount of redundant audio data that is encoded and transmitted in a packet 400, and/or to increase the number of bits with which the same amount of audio data is encoded, either of which can increase the latency for encoding, packaging, and/or transmitting the audio blocks.

In one or more implementations, an electronic device for which low latency is desired (e.g., the electronic device 105) may have a redundancy level that is lower than the lowest redundancy level available at one or more other devices (e.g., the electronic device 110 or the electronic device 115) that may participate in a group communications session. For example, the lowest redundancy level that is available at a particular electronic device may be limited by hardware, firmware, and/or software at the particular electronic device. For example, a particular electronic device may have audio sampling hardware or firmware that limits audio sampling to a maximum sampling rate that is too low to provide audio block sizes below a lowest audio block size. As another example, a particular electronic device may have operating system software and/or hardware that is not configured to generate audio blocks with an audio block size that is low enough to match the lowest audio block size of another electronic device with which the particular electronic device is participating in a conferencing session (e.g., the particular audio device may be a legacy device having software or firmware that has not been, or cannot be, upgraded to generate audio blocks below a lowest audio block size limit). For example, the electronic device 110 and the electronic device 115 may have a lowest audio block size of twenty milliseconds, and the electronic device 105 may have a lowest audio block size of ten milliseconds.

In one or more implementations, a device receiving audio data with a block size of 10 ms may set a jitter buffer size of, for example, 20 ms (e.g., twice the 10 ms audio block size) or more and a device receiving audio data with a block size of 10 ms may set a jitter buffer size of, for example, 40 ms (e.g., twice the 20 ms audio block size) or more. As discussed herein, using a larger jitter buffer size can increase the latency of the resulting audio output.

In one or more use cases, a group communications session can include the electronic device 105 having a first lowest audio block size, and the electronic device 110 and/or the electronic device 115 having a second lowest audio block size that is higher than the first lowest audio block size of the electronic device 105. As discussed in further detail here-inafter, a transmitting device and/or a receiving device may perform adjusted audio processing to account for multiple devices having multiple different lowest audio block sizes in one or more implementations. As discussed in further detail hereinafter, a transmitting device and/or a receiving device may perform adjusted audio processing to account for a handoff of group communications session from a device with a first lowest audio block size to a device with a second, different lowest audio block size.

In one or more implementations, irrespective of an elec-tronic device's lowest audio block size (or lowest redun-dancy level), an electronic device may be capable of switch-ing between multiple audio block sizes (e.g., and multiple corresponding redundancy levels). For example, an electronic device participating in a group conferencing session (e.g., the electronic device 105 or the electronic device 110 in the use case of FIG. 3) may determine an amount of redundancy (e.g., a redundancy level) to be used for transmission of audio data for the group conferencing session based on a weighted average of network congestion information (e.g., a packet loss rate or a function thereof) and the expected delay associated with the amount of redundancy. For example, the redundancy level to use at a current time (e.g., during a group communications session) may be determined using Equation (1) below:

$$\text{Redundancy}(PLR, \text{Expected Delay}) = \quad (1)$$
$$\text{alpha} * f(PLR) + \text{gamma} * f(\text{Expected Delay}),$$

where alpha is a weight for the PLR and gamma is a weight for the Expected Delay (e.g., the expected delay time for that redundancy). The weight alpha and the weight gamma may sum to a value of one in one or more implementations. The weights alpha and gamma may have the same or different signs in various implementations.

In the example of Equation (1), the weight alpha is applied to a function f(PLR) of the packet loss rate, and the weight gamma is applied to a function f(Expected Delay) of the expected delay time. The functions f(PLR) and f(Expected Delay) may be the same or different functions in various implementations. In one or more implementations, the functions f(PLR) and f(Expected Delay) may be functions that respectively normalize and convert the packet loss rate and the expected delay time to a common set of normalized units that can be combined (e.g., as in the weighted average of the above equation) with each other to output a redundancy level. In one or more implementations, the output of the function f(PLR) may increase when the PLR increases. In one or more implementations, the output of the function f(Expected Delay) may decrease as the expected delay time increases. In this way, the effect of the function f(Expected Delay), weighted by the weight gamma, may counter the ability of the function f(PLR), weighted by the weight alpha, to raise the redundancy level when the PLR increases. In this way, a relatively low latency (e.g., lower than would occur if the expected delay time were not used to determine the redundancy, such as lower than 300 ms, lower than 150 ms, lower than 100 ms, or lower than 75 ms) can be maintained.

In one or more implementations, the output of Equation (1) may be a number that corresponds to one of the above-mentioned redundancy levels. For example, an output of the above equation that is less than or equal to one may indicate the first (e.g., lowest available at a particular device) redundancy level, an output of the above equation that is greater than one and less than or equal to 1.5 may indicate the second redundancy level, an output of the above equation that is greater than 1.5 and less than or equal to two may indicate the third redundancy level, an output of the above equation that is greater than two and less than or equal to 2.5 may indicate the fourth redundancy level, etc. In one or more other implementations, Equation (1) may be evaluated for each of multiple redundancy levels that are available at a particular device (using the expected delay times corresponding to those redundancy levels), and the redundancy level that results in an output of the above equation in a desired range (e.g., above or below a threshold) may be selected as the redundancy level to be used for transmission of audio data by that device for the group communication session. In one or more other implementations, the redundancy may be increased (e.g., to a next higher redundancy level) when the output of Equation (1) exceeds a threshold.

In one or more implementations, the weights alpha and gamma may have been previously determined empirically to provide low latency audio data even in the presence of packet loss. For example, using Equation (1), in one or more use cases, even when the packet loss rate increases, the inclusion of the weight, gamma, applied to the function f(Expected Delay) may prevent the redundancy level from being increased (e.g., until the packet loss rate increases to an amount that results in the weight, alpha, applied to the function f(PLR) overcoming the counterbalancing effect of the weight, gamma, applied to the function f(Expected Delay)). Using Equation (1) to determine the amount of redundancy to be used in transmission of audio data for group communication sessions, the latency of the audio data for the group communication session may be maintained at or below seventy five to one hundred millisecond, in some implementations.

In one or more implementations, the amount of redundancy to be used for transmitting audio data can be determined without the use of Equation (1). For example, the amount of redundancy can be determined, in one or more implementations, in separate operations involving the packet loss rate and the expected delay time. For example, when a packet loss rate indicates an increase in redundancy, the expected delay time for that increase in redundancy can be compared to a latency threshold. If the expected delay time for that increase in redundancy exceeds the latency threshold, the redundancy may not be increased. If the expected delay time for that increase in redundancy is below the latency threshold, the redundancy may be increased as indicated by the packet loss rate.

FIG. 5 illustrates an example process 500 for providing low latency audio for group communication sessions, in accordance with one or more implementations. For explanatory purposes, the process 500 is primarily described herein with reference to the electronic device 105 of FIGS. 1 and 2. However, the process 500 is not limited to the electronic device 105 of FIGS. 1 and 2, and one or more blocks (or operations) of the process 500 may be performed by one or more other components of other suitable devices, including the electronic device 110, the electronic device 115, and/or the servers 120. Further for explanatory purposes, some of the blocks of the process 500 are described herein as occurring in serial, or linearly. However, multiple blocks of the process 500 may occur in parallel. In addition, the blocks of the process 500 need not be performed in the order shown and/or one or more blocks of the process 500 need not be performed and/or can be replaced by other operations.

In the example of FIG. 5, at block 502, a first electronic device (e.g., the electronic device 105) may obtain, during a communication session (e.g., a group communication session) with a second electronic device (e.g., the electronic device 110), a packet loss rate (e.g., PLR) associated a network connection (e.g., via network 106 of FIG. 1) for the communication session. Obtaining the packet loss rate may include receiving one or more packets over a period of time (e.g., one second, a few seconds, five seconds, or ten seconds), inspecting the one or more received packets and identifying information (e.g., sequence identifiers and/or time stamps) in the one or more received packets, determining a number of missing packets over the period of time, and computing the packet loss rate based on the number of missing packets and a number of expected packets over the period of time. The packet loss rate may be determined at the first electronic device or determined at the second electronic device and communicated from the second electronic device to the first electronic device in various implementations.

At block 504, the first electronic device may determine a redundancy level for audio data of the first electronic device, based at least in part on the packet loss rate and an expected delay time associated with the redundancy level. In one or more implementations, determining the redundancy level based at least in part on the packet loss rate and the expected delay time may include determining the redundancy level based on a weighted combination of a function of the packet loss rate and a function of the expected delay time. For example, the redundancy level may be determined using the equation: Redundancy (PLR, Expected Delay)=alpha*f (PLR)+gamma*f(Expected Delay), where alpha is a weight for the PLR and gamma is a weight for the Expected Delay, in one or more implementations.

In one or more implementations, obtaining the packet loss rate may include detecting an increase in the packet loss rate while providing the audio data at a current redundancy level (e.g., during the communication session), the expected delay time includes a previously determined delay time for packets transmitted using another redundancy level different from the current redundancy level (e.g., a next higher redundancy level), and determining the redundancy level at block 504 includes determining, based at least in part on the previously determined delay time, that the audio data is to be provided using the current redundancy level (e.g., that no switch from the current redundancy level should be made).

In one or more implementations, the process 500 may also include detecting, by the first electronic device, an additional increase in the packet loss rate while providing the audio data using the current redundancy level, and determining, based at least in part on the increase in packet loss rate, the additional increase in the packet loss rate, and the expected delay time for the other redundancy level different from the current redundancy level, that the audio data is to be provided using the other redundancy level. In this way, in one or more use cases, determining the redundancy level based at least in part on the expected delay time can cause the first electronic device to remain at a current redundancy level even when the packet loss rate increases (e.g., by less than a threshold amount of increase), thereby maintaining low latency for the audio data while accepting some amount of missing audio data.

In one or more implementations, determining the redundancy level may include switching from a current redundancy level (e.g., with a current audio block size, such as the redundant audio block size, Sr) for the audio data to a higher redundancy level (e.g., with an audio block size, such as the redundant audio block size, Sr, that is larger than the current audio block size) for the audio data based at least in part on the packet loss rate and the expected delay time. For example, the expected delay time may be or include a previously determined delay time of the higher redundancy level relative to a previously determined delay time of the current redundancy level. In one or more implementations, the process 500 may also include obtaining, by the first electronic device while providing the audio data at the higher redundancy level during the communication session, an updated packet loss rate associated with the communication session; and switching from the higher redundancy level to a further higher redundancy level for the audio data based at least in part on the updated packet loss rate and another expected delay time associated with the further higher redundancy level (e.g., if the updated packet loss rate, when plugged into Eq. (1) above overcomes the effect, in Eq. (1) of the other expected delay time, such as when the value of alpha*f(PLR) exceeds the value of gamma*f(Expected Delay)).

At block 506, the audio data may be provided (e.g., transmitted) from the first electronic device to the second electronic device during the communication session using the determined redundancy level. For example, the audio data may be transmitted to the second electronic device using the communications circuitry 208 of FIG. 2, and using an audio block size (e.g., a size, Sr, or a size S) corresponding to the determined redundancy level. Providing the audio data from the first electronic device to the second electronic device may include encoding the audio data at the first electronic device, packaging the encoded audio data in a packet having an audio block size corresponding to the determined redundancy level, and transmitting the packet to the second electronic device. The second electronic device may then decode the encoded audio data and output, from a speaker of the second electronic device, audio corresponding to the audio data with a latency (e.g., a delay time between input of the audio at the first electronic device and output of the audio at the second electronic device) that is less than, for example, seventy five to one hundred milli-second (in some examples).

In one or more implementations, the redundancy level may correspond to an amount of redundant audio data (e.g., in one or more redundant audio block(s) 404), also previously provided in a prior packet (e.g., a packet 400 that was previously sent to the second electronic device), that is included in a current packet (e.g., a packet 400 currently being sent to the second electronic device) with primary audio data (e.g., in a primary audio block 402) for the current packet. For example, the amount of redundant audio data may correspond to a block size (e.g., a block size Sr) of the redundant audio data.

Although various examples are described herein in which an amount of redundancy is determined for transmitting audio data based on measure of network congestion (e.g., a packet loss rate or other measure of congestion) and based on an expected delay time for the amount of redundancy (e.g., as determined using Eq. (1) above), it is also appreciated that the subject technology can be applied for other types of data. For example, an amount of redundancy may be determined for transmitting video data, content sharing data, and/or any other data that can be transmitted in packets over network, based on a measure of network congestion (e.g., a packet loss rate or other measure of congestion) and based on an expected delay time for the amount of redundancy (e.g., as determined using Eq. (1) above).

The example process 500 of FIG. 5 may be performed by any electronic device capable of utilizing multiple different audio block sizes and/or corresponding redundancy levels. However, as described herein, the lowest available audio block size (and corresponding redundancy level) for one electronic device may be different from the lowest available audio block size (and corresponding redundancy level) of another electronic device. Aspects of the subject technology can provide for group communications between devices having different lowest available audio block sizes (e.g., and different corresponding lowest redundancy levels), and/or for handoff of a group communications session from a first device of a user and having a first lowest audio block size to a second device of the user and having a second, different, lowest audio block size. Aspects of the subject technology can provide for group communications between devices having different audio sampling rates.

Figure 6:
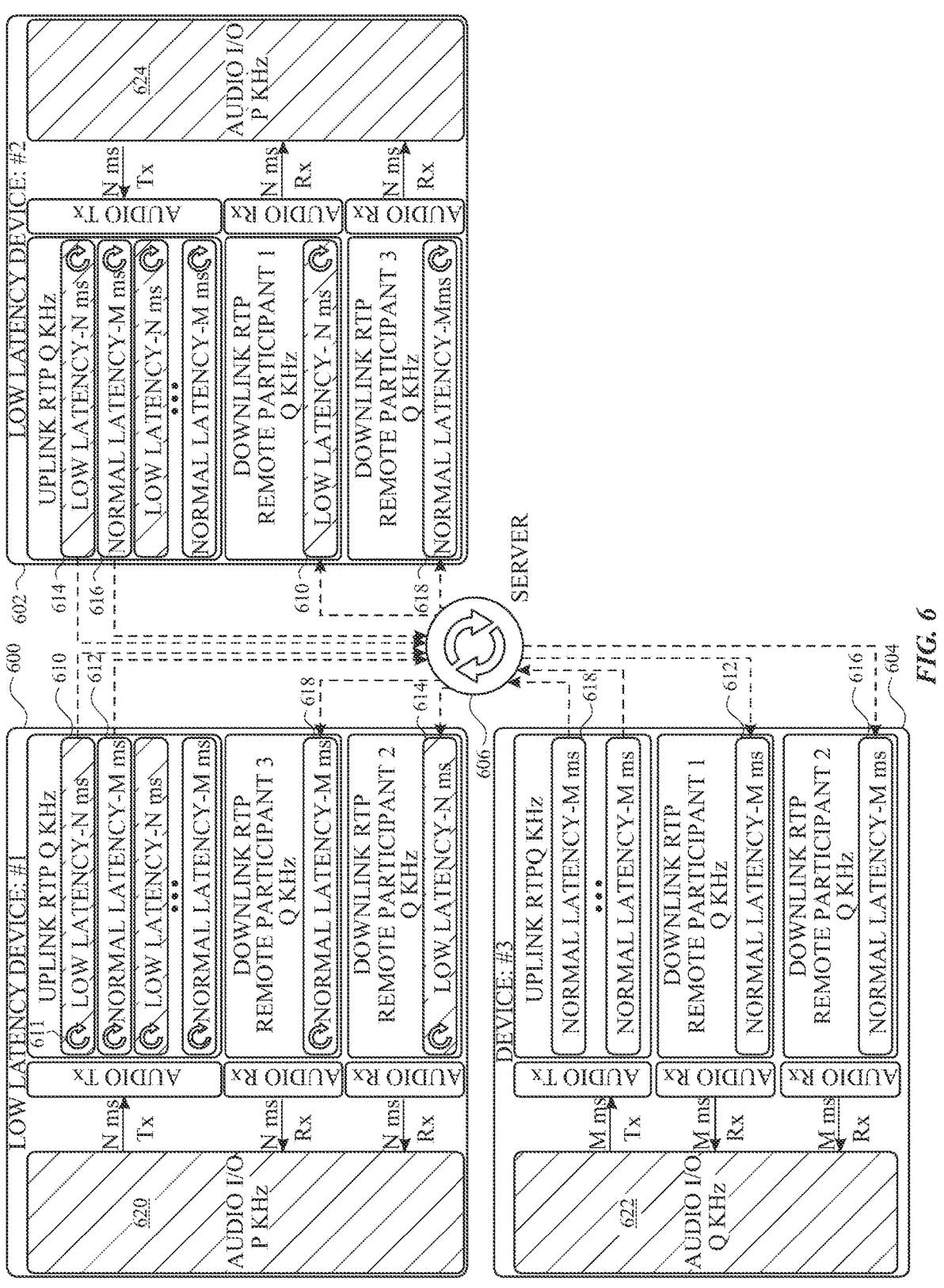
FIG. 6 illustrates an example of a group communication session including multiple devices providing multiple respective audio streams with multiple corresponding audio block sizes, in accordance with one or more implementations.

For example, FIG. 6 illustrates aspects of a group communication session that includes a first device 600 (e.g., "low latency device #1") and a second device (e.g., "low latency device #2"). For example, the first device 600 may be a first instance of an electronic device 105 and the second device 602 may be a second, separate, instance of an electronic device 105. As shown, the first device 600 and the second device 602 may each generate audio blocks with an audio block size of N ms (e.g., 10 ms). For example, the first device 600 and the second device 602 may respectively include audio circuitry 620 and audio circuitry 624, each of which captures audio samples at a sample rate of P KHz (e.g., 32 kHz or 48 kHz), and provides the captured audio samples for transmission in N ms audio blocks. As shown, the first device 600 may transmit an (e.g., outgoing) audio stream 610 including the P KHz audio samples in the N ms audio blocks. As shown, the audio stream 610 may be received (e.g., via a server 606, such as a relay server) at the second device 602. The N ms audio blocks in the audio stream 610 may then be provided to the audio circuitry 624 and/or other circuitry at the second device 602 for further processing (e.g., to generate an audio output from the second device 602).

In the example of FIG. 6, the group communication session also includes a third device 604. For example, the third device 604 may be an instance of an electronic device 104, an electronic device 110, or an electronic device 115). As shown, the third device 604 may obtain audio blocks with an audio block size of M ms (e.g., 20 ms) that is different from the N ms audio block size used by the first device 600 and the second device 602. For example, the N ms audio block size may be a lowest audio block size available at the first device 600 and the second device 602, the M ms audio block size used by the third device 604 may be a lowest audio block size available at the third device 604, and the lowest audio block size available at the first device 600 and the second device 602 (e.g., the low latency devices) may be lower than the lowest audio block size available at the third device 604.

As shown, the third device 604 may also include audio circuitry 622 that captures audio samples at a sample rate of Q kHz (e.g., 24 kHz, or another sample rate that is lower than the P KHz rate of the first device 600 and the second device 602), and provides the captured Q kHz audio samples for transmission in M ms audio blocks. In one or more implementations the first device 600 and the second device 602 may perform operations for compatibility of the lowest audio block size available at the first device 600 and the second device 602 with the lowest audio block size available at the third device 604 in a group communication session and/or for compatibility of the P KHz sample rate of the first device 600 and the second device 602 with the Q KHz sample rate of the third device 604.

For example, as shown in FIG. 6, in addition to the audio stream 610 in which the audio samples obtained at 48 kHz are packaged into audio blocks with the N ms audio block size, the first device 600 may also transmit an audio stream 612 in which the audio samples obtained at 48 kHz are packaged into audio blocks with an M ms (e.g., 20 ms) audio block size. The first device 600 may also perform a sample rate conversion operation 611 on the audio samples in the N ms audio blocks of the audio stream 610 and on the audio samples of the M ms audio blocks in the audio stream 612 (e.g., for compatibility with a Q kHz network clock and/or with the Q kHz sample rate of the third device 604).

As shown, the audio stream 612 including the M ms audio blocks may be received (e.g., via the server 606) at the third device 604. The M ms audio blocks in the audio stream 612 may then be provided to the audio circuitry 622 and/or other circuitry at the third device 604 for further processing (e.g., to generate an audio output from the third device 604).

As shown, the first device 600 may transmit both the audio stream 610 and the audio stream 612 (e.g., and/or one or more other audio streams) at a Q kHz network clock rate that is compatible with a Q kHz network clock rate of the third device 604. In one or more implementations, because the audio samples are obtained at P KHz at the first device 600 and received at (and processed by) the third device that samples audio at a sample rate of Q kHz, the first device 600 may also modify the time stamps (e.g., RTP time stamps) associated with the audio blocks in the audio stream 610 for compatibility at the third device 604. For example, the first device 600 may multiply the time stamps for the audio blocks in the audio stream 610 by a ratio of the Q KHz sample rate of the third device 604 to the P KHz sample rate of the first device 600. In this way, the third device 604 can participate in the group communication session with the first device 600 and/or the second device 602, without performing any special operations to account for (e.g., or even being aware of) the first device 600 and/or the second device 602 obtaining audio samples at a different sampling rate and/or having access to the N ms lower block size.

In one or more implementations, the first device 600 may also modify the time stamps of the audio blocks in the audio stream 612 (e.g., by multiplying the time stamps for the audio blocks in the audio stream 612 by the ratio of the Q kHz sample rate of the third device 604 to the P KHz sample rate of the first device 600), even though the second device 602 (which receives the audio stream 610) samples audio at the same P KHz sample rate as the first device 600. In these implementations, the second device 602 may multiply the time stamps for the audio blocks in the received audio stream 612 by the inverse of the ratio of the Q kHz sample rate of the third device 604 to the P KHz sample rate of the first device 600 (e.g., to de-modify the time stamps) before providing the audio blocks of the audio stream 612 to the audio circuitry 624 for further processing.

As shown in FIG. 6, the third device 604 may obtain audio samples at the Q kHz sample rate, and package the audio samples into audio blocks having M ms (e.g., 20 ms) audio block sizes. The third device 604 may then transmit the M ms audio blocks in an audio stream 618. As shown, the audio stream 618 may be received by the first device 600 and the second device 602. The second device 602 may provide the audio blocks of the audio stream 618 to the audio circuitry 624 for further processing without modifying the time stamps associated with the audio blocks of the audio stream 618. The first device 600 may provide the audio blocks of the audio stream 618 to the audio circuitry 620 for further processing without modifying the time stamps associated with the audio blocks of the audio stream 618.

In one or more implementations, the second device 602 may process the audio stream 610 from the first device 600 through a first buffer (e.g., a jitter buffer) having a buffer size (e.g., a jitter buffer depth) that is based on the N ms audio block size (e.g., a multiple of the N ms audio block size), and may process the audio stream 618 from the third device 604 through a second buffer (e.g., a jitter buffer) having a buffer size (e.g., a jitter buffer depth) that is based on the M ms audio block size (e.g., a multiple of the M ms audio block size). Because the M ms audio block size is larger than the N ms audio block size, the audio stream 610 may be processed by the second device 602 with a lower latency than the audio stream 612.

As shown in FIG. 6, the second device 602 may also generate an (e.g., outgoing) audio stream 614 that includes audio samples obtained at the P KHz sampling rate and packaged into audio blocks having an N ms audio block size. As shown, the audio stream 614 may be received by the first device 600. The second device 602 may modify the time stamps of the audio blocks in the audio stream 614 (e.g., based on the ratio of the Q kHz sampling rate to the P kHz sampling rate). The first device 600 may de-modify the modified time stamps received from the second device 602 and provide the audio blocks of the audio stream 614 to the audio circuitry 620 for further processing. As shown, the second device 602 may also generate an (e.g., outgoing) audio stream 616 that includes audio samples obtained at the P KHz sampling rate and packaged into audio blocks having an M ms audio block size. As shown, the audio stream 616 may be received by the third device 604. The second device 602 may modify the time stamps of the audio blocks in the audio stream 616 (e.g., based on the ratio of the Q KHz sampling rate to the P KHz sampling rate).

Figure 7:
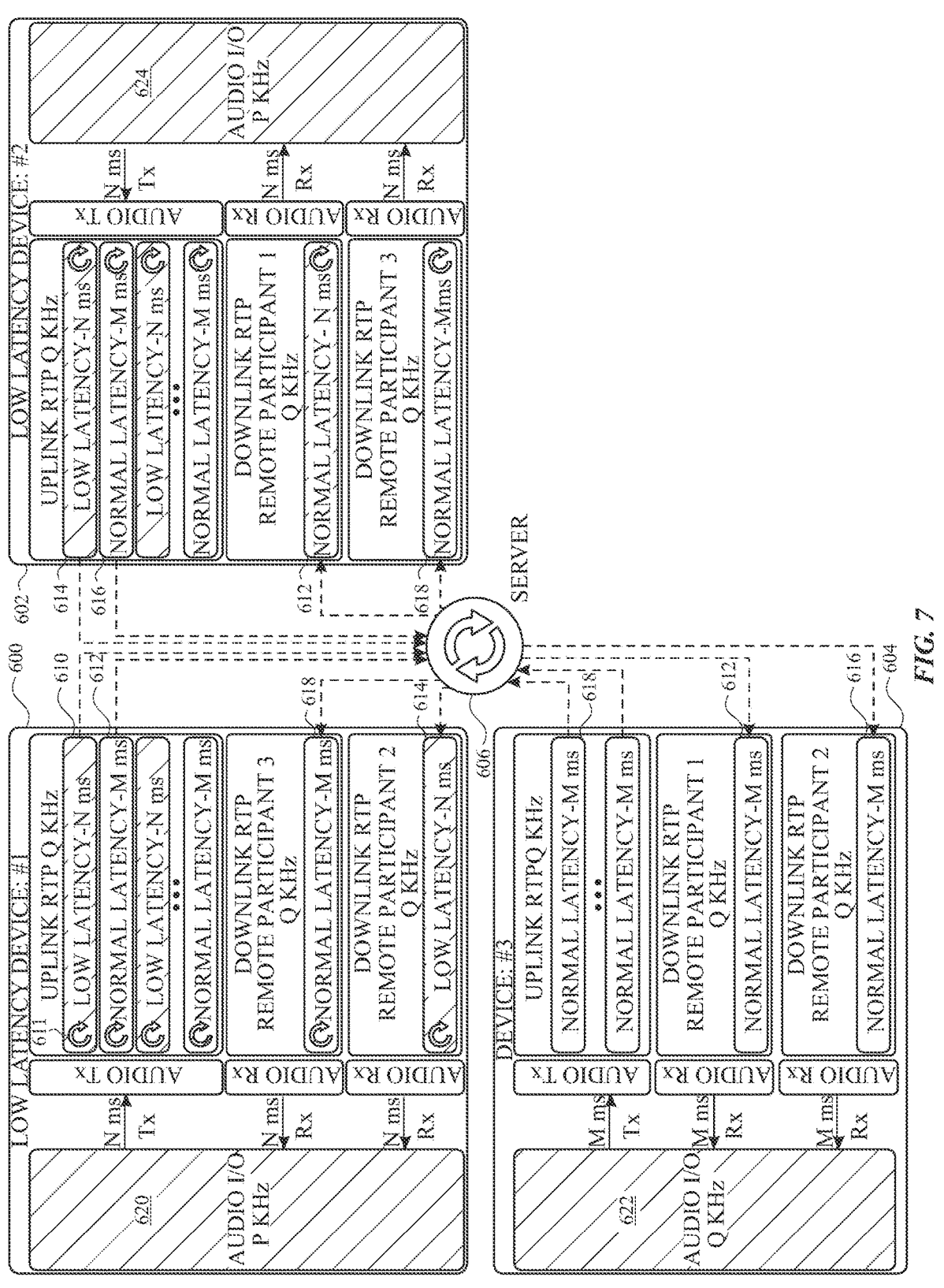
FIG. 7 illustrates an example an electronic device participating in a group communication session and opting into a higher audio block size audio stream, in accordance with one or more implementations.
Figure 8:
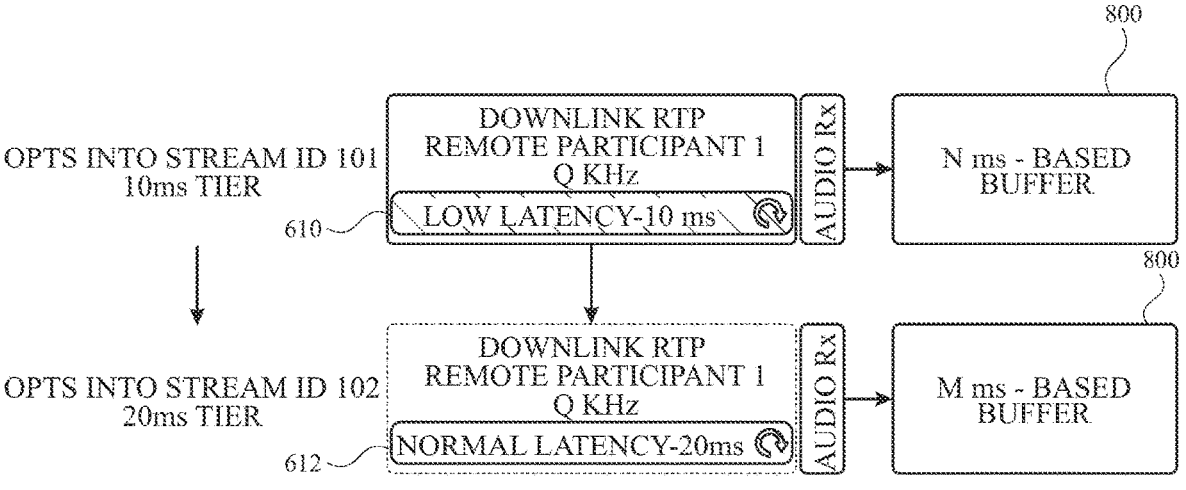
FIG. 8 is a diagram illustrating an electronic device participating in a group communication session and modifying a buffer size responsive to a change in an audio block size in an incoming audio stream, in accordance with one or more implementations.

In one or more use cases, the block size of an incoming audio stream received that the first device 600 and/or the second device 602 may change, and the first device 600 and/or the second device 602 may, responsively, change the size of the buffer (e.g., the jitter buffer) through which that audio stream is processed. For example, FIG. 7 illustrates an example use case in which the second device 602 opts into receiving the audio stream 612 (e.g., having the M ms audio blocks) from the first device 600 rather than the audio stream 610 (e.g., having the N ms audio blocks). As shown in FIG. 8, in this example use case, the second device 602 may opt into the audio stream 610 and set a size of a jitter buffer 800 according to the N ms audio block size in the audio stream 610, and then opt into the audio stream 612 and modify the size of the jitter buffer 800 according to the M ms audio block size. However, the example of FIGS. 7 and 8 is merely one example in which the size of the audio blocks in an audio stream can change.

For example, in another illustrative use case, the first device 600 may be an implementation of the electronic device 105 and may be associated with a user account of a user, and the user may have another electronic device (e.g., the electronic device 104) associated with the same user account. For any of various reasons (e.g., a change in location, a loss or lack of power, etc.), the user may choose to handoff the group communication session that is being conducted using the first device 600 having the N ms audio blocks, to another device (e.g., the electronic device 110) that does not have the capability of generating N ms audio blocks. When the participation in the group communications session is handed off from the first device 600 to the electronic device 104, the electronic device 104 may transmit an audio stream to the second device 602 that includes M ms audio blocks and, responsively, the second device 602 may increase the size of the buffer (e.g., the jitter buffer) through which the audio stream is processed. Although the example of FIG. 8 is described in connection with the second device 602 opting into the audio stream 612 from the first device 600, the operations of FIG. 8 can be performed by the first device 600 (e.g., responsive to the first device opting into a higher audio block size stream from the second device 602, or responsive to the second device 602 handing off the participation in the group communication session to another device associated with the same user account as the second device 602 and having a lowest audio block size that is higher than the lowest audio block size of the second device 602).

FIG. 9 illustrates an example process 900 for providing group communication sessions for devices using various audio block sizes, in accordance with one or more implementations. For explanatory purposes, the process 900 is primarily described herein with reference to the electronic device 105 and the electronic device 110 of FIGS. 1 and 2. However, the process 900 is not limited to the electronic device 105 and the electronic device 110 of FIGS. 1 and 2, and one or more blocks (or operations) of the process 900 may be performed by one or more other components of other suitable devices, including the electronic device 104, the electronic device 115, and/or the servers 120. Further for explanatory purposes, some of the blocks of the process 900 are described herein as occurring in serial, or linearly. However, multiple blocks of the process 900 may occur in parallel. In addition, the blocks of the process 900 need not be performed in the order shown and/or one or more blocks of the process 900 need not be performed and/or can be replaced by other operations.

At block 902, a first device (e.g., first device 600 of FIG. 6, such as an implementation of an electronic device 105) may receive, from a second device (e.g., second device 602 of FIG. 6, such as another implementation of an electronic device 105) during a communication session between the first device and the second device, a first incoming audio stream (e.g., audio stream 614) including incoming audio blocks having a first audio block size (e.g., an N ms audio block size). The first audio block size may be a lowest audio block size that is available at the first device and the second device.

At block 904, the first device may process the first incoming audio stream through a first buffer (e.g., a jitter buffer 800) having a first buffer size that is based on the first audio block size (e.g., a multiple of the first audio block size). For example, processing the first incoming audio stream may include generating a first audio output from the first device, the first audio output corresponding to avatar information received from the second device. For example, the second device may generate an avatar of a user of the second device, for three-dimensional display within a shared XR experience generated by the first device and the second device for the group communication session. The avatar may be configured, by the third device, to move in accordance with movements of the user of the second device, and may be transmitted to the first device for display in coordination with audio data corresponding to spoken words and/or sounds of the user of the second device.

At block 906, the first device may determine that a third device (e.g., third device 604, such as an implementation of the electronic device 104 or electronic device 110) has joined the communication session. A lowest audio block size (e.g., an M ms audio block size) that is available at the third device may be larger than the lowest audio block size (e.g., the N ms audio block size) that is available at the first device and the second device.

At block 908, the first device may receive, from the third device, a second incoming audio stream (e.g., audio stream 618) including incoming audio blocks having a second audio block size (e.g., an M ms audio block size) corresponding to the lowest audio block size that is available at the third device.

At block 910, the first device may process the second incoming audio stream through a second buffer (e.g., the jitter buffer 800 or another jitter buffer) having a second buffer size that is based on the second audio block size (e.g., a multiple of the second audio block size). For example, processing the second incoming audio stream may include generating a second audio output from the first device, the second audio output corresponding to video information received from the third device. For example, the third device may capture video of a user of the third device while the user of the third device speaks, and may transmit the video data to the first device and the second device for display in correspondence with audio output generated according to the speech of the user of the third device.

In one or more implementations, the second device and the third device are associated with a user; the third device replaces the second device in the communication session (e.g., responsive to a handoff from the second device to the third device); the second incoming audio stream replaces the first incoming audio stream; and processing the first incoming audio stream through the second buffer having the second buffer size that is based on the second audio block size includes increasing the first buffer size of the first buffer to form the second buffer (e.g., as illustrated by the increase in the size of the jitter buffer 800 in FIG. 8).

In one or more other implementations, second device remains in the communication session with the first device and the third device (e.g., as in the example of FIG. 6), and the first device may also: obtain a plurality of audio samples; send, to the second device during the communication session, a first outgoing audio stream (e.g., audio stream 610) including the audio samples in first outgoing audio blocks having the first audio block size; and send, to the third device during the communication session, a second outgoing audio stream (e.g., the audio stream 612) including the audio samples in second outgoing audio blocks having the second audio block size.

In one or more implementations, obtaining the plurality of audio samples may include obtaining the plurality of audio samples at a first sampling rate (e.g., P KHz) that is faster than a second sampling rate (e.g., Q kHz) at which the third device is capable of obtaining audio samples. The first device may also obtain (e.g., generate) a time stamp (e.g., an RTP time stamp) corresponding to at least one of the second outgoing audio blocks; modify the time stamp based on a ratio of the first sampling rate and the second sampling rate to generate a modified time stamp (e.g., by dividing time stamp by the ratio of the first sampling rate and the second sampling rate); and provide the modified time stamp, with the at least one of the second outgoing audio blocks, to the third device.

In one or more implementations, the second device may be capable of obtaining audio samples at the first sampling rate (e.g., P KHz), and the first device may also obtain (e.g., generate) a time stamp corresponding to at least one of the first outgoing audio blocks; modify the time stamp corresponding to the at least one of the first outgoing audio blocks based on the ratio of the first sampling rate and the second sampling rate (e.g., by dividing the time stamp by the ratio of the first (higher) sampling rate and the second (lower) sampling rate) to generate an additional modified time stamp (e.g., even though the second device is capable of sampling and/or processing audio samples at the first sampling rate); and provide the additional modified time stamp, with the at least one of the first outgoing audio blocks, to the second device. In one or more implementations, the second device may de-modify the additional modified time stamp (e.g., by multiplying the time stamp by the ratio of the first sampling rate and the second sampling rate) to obtain the original time stamp before providing the received at least one of the first outgoing audio blocks from the first device to audio and/or other processing circuitry at the second device for further processing.

In one or more implementations, the first device may also: receive a first incoming time stamp with the first incoming audio stream; modify the first incoming time stamp based on the ratio of the first sampling rate and the second sampling rate (e.g., by multiplying the first incoming time stamp by the ratio of the first sampling rate and the second sampling rate) to generate a modified first incoming time stamp (e.g., to de-modify a modification made at the second device); and process the first incoming audio stream based at least in part on the modified first incoming time stamp. In one or more implementations, the first device may also receive a second incoming time stamp with the second incoming audio stream; and process the second incoming audio stream based at least in part on the second incoming time stamp without modification to the second incoming time stamp (e.g., because the second incoming time stamp corresponds to the second sampling rate at the third device, and was not modified by the third device).

In one or more implementations, the first device may opt to receive, in place of the first incoming audio stream including the incoming audio blocks having the first audio block size from the second device, a third incoming audio stream (e.g., audio stream 616) including incoming audio blocks having the second audio block size from the second device (e.g., as described in connection with FIG. 8 from the perspective of the second device 602).

As described above, one aspect of the present technology is the gathering and use of data available from specific and legitimate sources for providing low latency audio for group communication sessions. The present disclosure contemplates that in some instances, this gathered data may include personal information data that uniquely identifies or can be used to identify a specific person. Such personal information data can include audio data, voice data, demographic data, location-based data, online identifiers, telephone numbers, email addresses, home addresses, encryption information, data or records relating to a user's health or level of fitness (e.g., vital signs measurements, medication information, exercise information), date of birth, or any other personal information.

The present disclosure recognizes that the use of personal information data, in the present technology, can be used to the benefit of users. For example, the personal information data can be used for providing low latency audio for group communication sessions.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the example of providing low latency audio for group communication sessions, the present technology can be configured to allow users to select to "opt in" or "opt out" of participation in the collection and/or sharing of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level or at a scale that is insufficient for facial recognition), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 10:
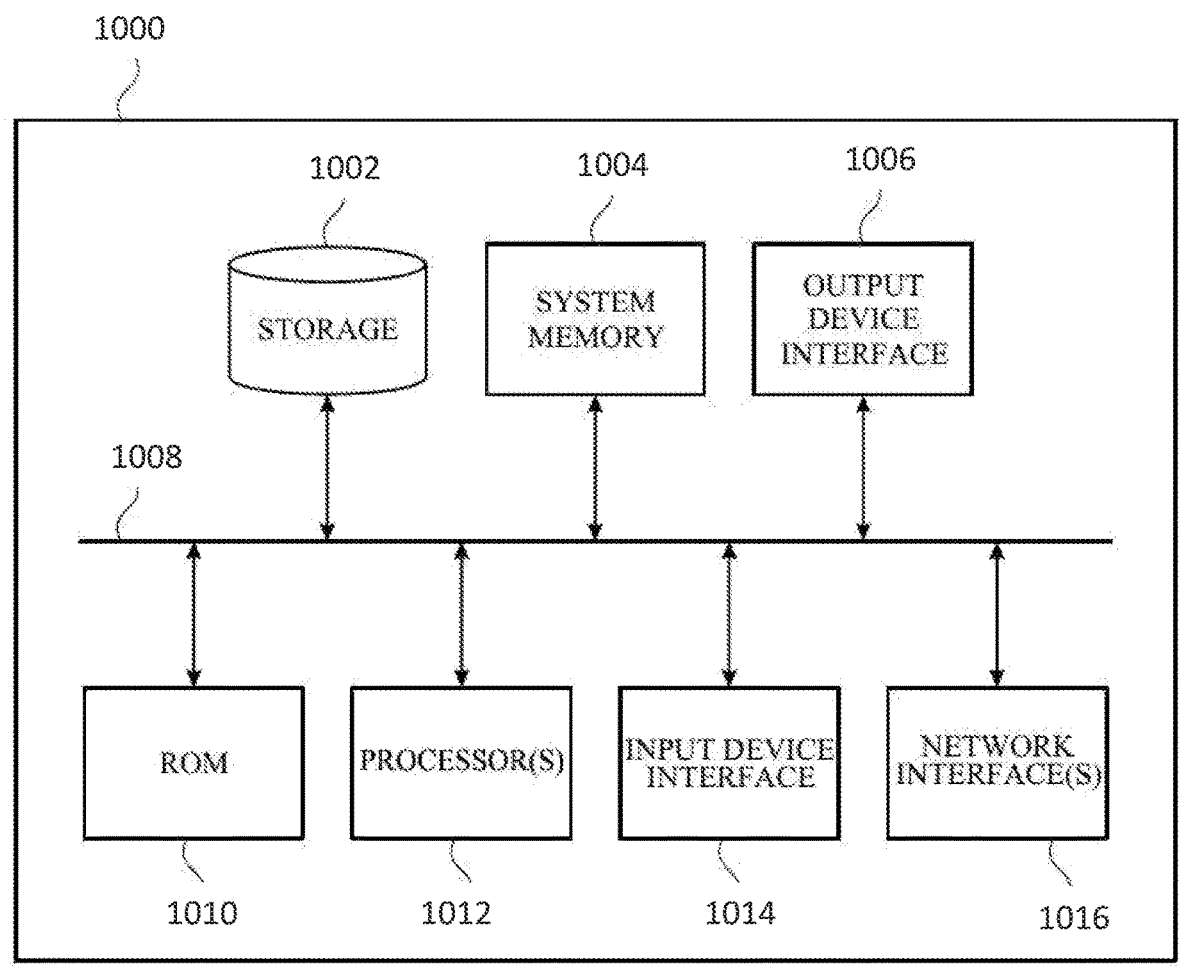
FIG. 10 illustrates an electronic system with which one or more implementations of the subject technology may be implemented.

FIG. 10 illustrates an electronic system 1000 with which one or more implementations of the subject technology may be implemented. The electronic system 1000 can be, and/or can be a part of, the electronic device 105, the electronic device 104, the electronic device 110, the electronic device 115, and/or the server 120 as shown in FIG. 1. The electronic system 1000 may include various types of computer readable media and interfaces for various other types of computer readable media. The electronic system 1000 includes a bus 1008, one or more processing unit(s) 1012, a system memory 1004 (and/or buffer), a ROM 1010, a permanent storage device 1002, an input device interface 1014, an output device interface 1006, and one or more network interfaces 1016, or subsets and variations thereof.

The bus 1008 collectively represents all system, peripheral, and chipset buses that communicatively connect the numerous internal devices of the electronic system 1000. In one or more implementations, the bus 1008 communicatively connects the one or more processing unit(s) 1012 with the ROM 1010, the system memory 1004, and the permanent storage device 1002. From these various memory units, the one or more processing unit(s) 1012 retrieves instructions to execute and data to process in order to execute the processes of the subject disclosure. The one or more processing unit(s) 1012 can be a single processor or a multi-core processor in different implementations.

The ROM 1010 stores static data and instructions that are needed by the one or more processing unit(s) 1012 and other modules of the electronic system 1000. The permanent storage device 1002, on the other hand, may be a read-and-write memory device. The permanent storage device 1002 may be a non-volatile memory unit that stores instructions and data even when the electronic system 1000 is off. In one or more implementations, a mass-storage device (such as a magnetic or optical disk and its corresponding disk drive) may be used as the permanent storage device 1002.

In one or more implementations, a removable storage device (such as a flash drive, and its corresponding disk drive) may be used as the permanent storage device 1002. Like the permanent storage device 1002, the system memory 1004 may be a read-and-write memory device. However, unlike the permanent storage device 1002, the system memory 1004 may be a volatile read-and-write memory, such as random access memory. The system memory 1004 may store any of the instructions and data that one or more processing unit(s) 1012 may need at runtime. In one or more implementations, the processes of the subject disclosure are stored in the system memory 1004, the permanent storage device 1002, and/or the ROM 1010 (which are each implemented as a non-transitory computer-readable medium). From these various memory units, the one or more processing unit(s) 1012 retrieves instructions to execute and data to process in order to execute the processes of one or more implementations.

The bus 1008 also connects to the input and output device interfaces 1014 and 1006. The input device interface 1014 enables a user to communicate information and select commands to the electronic system 1000. Input devices that may be used with the input device interface 1014 may include, for example, alphanumeric keyboards and pointing devices (also called "cursor control devices"). The output device interface 1006 may enable, for example, the display of images generated by electronic system 1000. Output devices that may be used with the output device interface 1006 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 10, the bus 1008 also couples the electronic system 1000 to one or more networks and/or to one or more network nodes, such as the electronic device 110 shown in FIG. 1, through the one or more network interface(s) 1016. In this manner, the electronic system 1000 can be a part of a network of computers (such as a LAN, a wide area network ("WAN"), or an Intranet, or a network of networks, such as the Internet. Any or all components of the electronic system 1000 can be used in conjunction with the subject disclosure.

These functions described above can be implemented in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (also referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; e.g., feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; e.g., by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and may interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

29 30

What is claimed is:

1. A method, comprising:

receiving, by a first device from a second device during a communication session between the first device and the second device, a first incoming audio stream including incoming audio blocks having a first audio block size, wherein the first audio block size is a lowest audio block size that is available at the first device and the second device;

processing the first incoming audio stream through a first buffer having a first buffer size that is based on the first audio block size;

determining, by the first device, that a third device has joined the communication session, wherein a lowest audio block size that is available at the third device is larger than the lowest audio block size that is available at the first device and the second device;

receiving, by the first device from the third device, a second incoming audio stream including incoming audio blocks having a second audio block size corresponding to the lowest audio block size that is available at the third device; and processing the first incoming audio stream through a second buffer having a second buffer size that is based on the second audio block size.

2. The method of claim 1, wherein:

the second device and the third device are associated with a user;

the third device replaces the second device in the communication session;

the second incoming audio stream replaces the first incoming audio stream; and processing the first incoming audio stream through the second buffer having the second buffer size that is based on the second audio block size comprises increasing the first buffer size of the first buffer to form the second buffer.

3. The method of claim 1, wherein second device remains in the communication session with the first device and the third device, the method further comprising:

obtaining, by the first device, a plurality of audio samples;

sending, by the first device to the second device during the communication session, a first outgoing audio stream including the audio samples in first outgoing audio blocks having the first audio block size; and sending, by the first device to the third device during the communication session, a second outgoing audio stream including the audio samples in second outgoing audio blocks having the second audio block size.

4. The method of claim 3, wherein obtaining the plurality of audio samples comprises obtaining the plurality of audio samples at a first sampling rate that is faster than a second sampling rate at which the third device is capable of obtaining audio samples, and wherein the method further comprises:

obtaining a time stamp corresponding to at least one of the second outgoing audio blocks;

modifying the time stamp based on a ratio of the first sampling rate and the second sampling rate to generate a modified time stamp; and providing the modified time stamp, with the at least one of the second outgoing audio blocks, to the third device.

5. The method of claim 4, wherein the second device is capable of obtaining audio samples at the first sampling rate, and wherein the method further comprises:

obtaining a time stamp corresponding to at least one of the first outgoing audio blocks;

modifying the time stamp corresponding to the at least one of the first outgoing audio blocks based on the ratio of the first sampling rate and the second sampling rate to generate an additional modified time stamp; and providing the additional modified time stamp, with the at least one of the first outgoing audio blocks, to the second device.

6. The method of claim 4, further comprising:

receiving a first incoming time stamp with the first incoming audio stream;

modifying the first incoming time stamp based on the ratio of the first sampling rate and the second sampling rate to generate a modified first incoming time stamp; and processing the first incoming audio stream based at least in part on the modified first incoming time stamp.

7. The method of claim 6, further comprising:

receiving a second incoming time stamp with the second incoming audio stream; and processing the second incoming audio stream based at least in part on the second incoming time stamp without modification to the second incoming time stamp.

8. The method of claim 1, wherein:

processing the first incoming audio stream comprises generating a first audio output from the first device, the first audio output corresponding to avatar information received from the second device, and processing the second incoming audio stream comprises generating a second audio output from the first device, the second audio output corresponding to video information received from the third device.

9. The method of claim 1, further comprising, by the first device, opting to receive, in place of the first incoming audio stream including the incoming audio blocks having the first audio block size from the second device, a third incoming audio stream including incoming audio blocks having the second audio block size from the second device.

10. A non-transitory machine readable medium comprising instructions which, when executed by one or more processors, causes the one or more processors to perform operations comprising:

receiving, by a first device from a second device during a communication session between the first device and the second device, a first incoming audio stream including incoming audio blocks having a first audio block size, wherein the first audio block size is a lowest audio block size that is available at the first device and the second device;

processing the first incoming audio stream through a first buffer having a first buffer size that is based on the first audio block size;

determining, by the first device, that a third device has joined the communication session, wherein a lowest audio block size that is available at the third device is larger than the lowest audio block size that is available at the first device and the second device;

receiving, by the first device from the third device, a second incoming audio stream including incoming audio blocks having a second audio block size corresponding to the lowest audio block size that is available at the third device; and processing the first incoming audio stream through a second buffer having a second buffer size that is based on the second audio block size.

11. The non-transitory machine readable medium of claim 10, wherein:
the second device and the third device are associated with a user;
the third device replaces the second device in the communication session;
the second incoming audio stream replaces the first incoming audio stream; and
processing the first incoming audio stream through the second buffer having the second buffer size that is based on the second audio block size comprises increasing the first buffer size of the first buffer to form the second buffer.

12. The non-transitory machine readable medium of claim 10, wherein second device remains in the communication session with the first device and the third device, the operations further comprising:
obtaining, by the first device, a plurality of audio samples;
sending, by the first device to the second device during the communication session, a first outgoing audio stream including the audio samples in first outgoing audio blocks having the first audio block size; and
sending, by the first device to the third device during the communication session, a second outgoing audio stream including the audio samples in second outgoing audio blocks having the second audio block size.

13. The non-transitory machine readable medium of claim 12, wherein obtaining the plurality of audio samples comprises obtaining the plurality of audio samples at a first sampling rate that is faster than a second sampling rate at which the third device is capable of obtaining audio samples, and wherein the operations further comprise:
obtaining a time stamp corresponding to at least one of the second outgoing audio blocks;
modifying the time stamp based on a ratio of the first sampling rate and the second sampling rate to generate a modified time stamp; and
providing the modified time stamp, with the at least one of the second outgoing audio blocks, to the third device.

14. The non-transitory machine readable medium of claim 13, wherein the second device is capable of obtaining audio samples at the first sampling rate, and wherein the operations further comprise:
obtaining a time stamp corresponding to at least one of the first outgoing audio blocks;
modifying the time stamp corresponding to the at least one of the first outgoing audio blocks based on the ratio of the first sampling rate and the second sampling rate to generate an additional modified time stamp; and
providing the additional modified time stamp, with the at least one of the first outgoing audio blocks, to the second device.

15. The non-transitory machine readable medium of claim 13, the operations further comprising:
receiving a first incoming time stamp with the first incoming audio stream;
modifying the first incoming time stamp based on the ratio of the first sampling rate and the second sampling rate to generate a modified first incoming time stamp; and
processing the first incoming audio stream based at least in part on the modified first incoming time stamp.

16. The non-transitory machine readable medium of claim 15, the operations further comprising:
receiving a second incoming time stamp with the second incoming audio stream; and

processing the second incoming audio stream based at least in part on the second incoming time stamp without modification to the second incoming time stamp.

17. A first device comprising:
a memory; and
at least one processor configured to:
receive, from a second device during a communication session between the first device and the second device, a first incoming audio stream including incoming audio blocks having a first audio block size, wherein the first audio block size is a lowest audio block size that is available at the first device and the second device;
process the first incoming audio stream through a first buffer having a first buffer size that is based on the first audio block size;
determine that a third device has joined the communication session, wherein a lowest audio block size that is available at the third device is larger than the lowest audio block size that is available at the first device and the second device;
receive, from the third device, a second incoming audio stream including incoming audio blocks having a second audio block size corresponding to the lowest audio block size that is available at the third device; and
process the first incoming audio stream through a second buffer having a second buffer size that is based on the second audio block size.

18. The first device of claim 17, wherein the at least one processor is further configured to:
obtain a plurality of audio samples;
send, to the second device during the communication session, a first outgoing audio stream including the audio samples in first outgoing audio blocks having the first audio block size; and
send, to the third device during the communication session, a second outgoing audio stream including the audio samples in second outgoing audio blocks having the second audio block size.

19. The first device of claim 18, wherein the at least one processor is configured to obtain the plurality of audio samples at a first sampling rate that is faster than a second sampling rate at which the third device is capable of obtaining audio samples, and is further configured to:
obtain a time stamp corresponding to at least one of the second outgoing audio blocks;
modify the time stamp based on a ratio of the first sampling rate and the second sampling rate to generate a modified time stamp; and
provide the modified time stamp, with the at least one of the second outgoing audio blocks, to the third device.

20. The first device of claim 19, wherein the second device is capable of obtaining audio samples at the first sampling rate, and wherein the at least one processor is further configured to:
obtain a time stamp corresponding to at least one of the first outgoing audio blocks;
modify the time stamp corresponding to the at least one of the first outgoing audio blocks based on the ratio of the first sampling rate and the second sampling rate to generate an additional modified time stamp; and
provide the additional modified time stamp, with the at least one of the first outgoing audio blocks, to the second device.

* * * * *